(12) United States Patent
Cilke et al.

(10) Patent No.: US 12,461,010 B2
(45) Date of Patent: Nov. 4, 2025

(54) SYSTEMS AND METHODS FOR REDUCING FALSE POSITIVE PARTICLE DETECTION EVENTS IN A PARTICLE DETECTOR

(71) Applicant: Particle Measuring Systems, Inc., Boulder, CO (US)

(72) Inventors: Joseph Thomas Cilke, Boulder, CO (US); Brett Haley, Boulder, CO (US); Scott Maclaughlin, Boulder, CO (US); Brian A. Knollenberg, Boulder, CO (US); Benjamin Martinez, Boulder, CO (US); Clayton Ellinwood, Boulder, CO (US)

(73) Assignee: Particle Measuring Systems, Inc., Boulder, CO (US)

( * ) Notice: Subject to any disclaimer, the term of this patent is extended or adjusted under 35 U.S.C. 154(b) by 0 days.

(21) Appl. No.: 18/947,333

(22) Filed: Nov. 14, 2024

(65) Prior Publication Data

US 2025/0180460 A1 Jun. 5, 2025

Related U.S. Application Data

(60) Provisional application No. 63/599,873, filed on Nov. 16, 2023.

(51) Int. Cl.
*G01N 15/1429* (2024.01)
*G01N 15/14* (2006.01)

(52) U.S. Cl.
CPC . *G01N 15/1429* (2013.01); *G01N 2015/1402* (2013.01); *G01N 2015/1486* (2013.01)

(58) Field of Classification Search
CPC ....... G01N 15/1429; G01N 2015/1402; G01N 2015/1486
See application file for complete search history.

(56) References Cited

U.S. PATENT DOCUMENTS

| 4,594,715 A | 6/1986 | Knollenberg |
| 4,798,465 A | 1/1989 | Knollenberg |

(Continued)

FOREIGN PATENT DOCUMENTS

WO WO 2019/082186 5/2019

OTHER PUBLICATIONS

Int'l Search Report and Written Opinion issued Feb. 12, 2025 in PCT/US2024/055855.

*Primary Examiner* — Ricky Go
(74) *Attorney, Agent, or Firm* — Leydig Voit & Mayer, Ltd.

(57) ABSTRACT

A method for reducing false-positive particle detection events of an optical particle detection system includes: filtering raw particle count data to produce filtered particle count data. The filtering includes: temporarily storing the raw particle count data for a buffering time period; segmenting the raw particle count data into a series of elemental data intervals; examining each elemental data interval for a noise signature; identifying a noise signature in the segmented raw particle count data; in response to the identified noise signature, flagging one or more sequential elemental data intervals as corresponding to a noise event; and removing the one or more flagged elemental data intervals from the raw particle count data to produce the filtered particle count data, and/or generating replacement data and substituting the replacement data for the one or more flagged elemental data intervals to produce the filtered particle count data.

27 Claims, 17 Drawing Sheets

(56) References Cited

U.S. PATENT DOCUMENTS

| | | |
|---|---|---|
| 4,893,928 A | 1/1990 | Knollenberg |
| 5,282,151 A | 1/1994 | Knollenberg |
| 5,283,199 A | 2/1994 | Bacon, Jr. et al. |
| 5,671,046 A | 9/1997 | Knowlton |
| 5,726,753 A | 3/1998 | Sandberg |
| 5,805,281 A | 9/1998 | Knowlton et al. |
| 5,861,950 A | 1/1999 | Knowlton |
| 5,889,589 A | 3/1999 | Sandberg |
| 6,167,107 A | 12/2000 | Bates |
| 6,246,474 B1 | 6/2001 | Cerni et al. |
| 6,275,290 B1 | 8/2001 | Cerni et al. |
| 6,615,679 B1 | 9/2003 | Knollenberg et al. |
| 6,709,311 B2 | 3/2004 | Cerni |
| 6,859,277 B2 | 2/2005 | Wagner et al. |
| 6,903,818 B2 | 6/2005 | Cerni et al. |
| 6,945,090 B2 | 9/2005 | Rodier |
| 7,030,980 B1 | 4/2006 | Sehler et al. |
| 7,088,446 B2 | 8/2006 | Cerni |
| 7,088,447 B1 | 8/2006 | Bates et al. |
| 7,208,123 B2 | 4/2007 | Knollenberg et al. |
| 7,235,214 B2 | 6/2007 | Rodier et al. |
| 7,456,960 B2 | 11/2008 | Cerni et al. |
| 7,576,857 B2 | 8/2009 | Wagner |
| 7,667,839 B2 | 2/2010 | Bates |
| 7,746,469 B2 | 6/2010 | Shamir et al. |
| 7,796,255 B2 | 9/2010 | Miller |
| 7,916,293 B2 | 3/2011 | Mitchell et al. |
| 7,973,929 B2 | 7/2011 | Bates |
| 7,985,949 B2 | 7/2011 | Rodier |
| 8,027,035 B2 | 9/2011 | Mitchell et al. |
| 8,109,129 B2 | 2/2012 | Gorbunov |
| 8,154,724 B2 | 4/2012 | Mitchell et al. |
| 8,174,697 B2 | 5/2012 | Mitchell et al. |
| 8,427,642 B2 | 4/2013 | Mitchell et al. |
| 8,800,383 B2 | 8/2014 | Bates |
| 8,869,593 B2 | 10/2014 | Gorbunov et al. |
| 9,631,222 B2 | 4/2017 | Ketcham et al. |
| 9,638,665 B2 | 5/2017 | Gorbunov |
| 9,682,345 B2 | 6/2017 | Gromala et al. |
| 9,808,760 B2 | 11/2017 | Gromala et al. |
| 9,810,558 B2 | 11/2017 | Bates et al. |
| 9,885,640 B2 | 2/2018 | Ketcham et al. |
| 9,983,113 B2 | 5/2018 | Matsuda et al. |
| 9,989,462 B2 | 6/2018 | Lumpkin et al. |
| 10,197,487 B2 | 2/2019 | Knollenberg et al. |
| 10,345,200 B2 | 7/2019 | Scialo et al. |
| 10,371,620 B2 | 8/2019 | Knollenberg et al. |
| 10,416,069 B2 | 9/2019 | Saitou et al. |
| 10,792,694 B2 | 10/2020 | Gorbunov et al. |
| 10,823,700 B2 | 11/2020 | Rocco et al. |
| 10,859,487 B2 | 12/2020 | Knollenberg et al. |
| 10,908,059 B2 | 2/2021 | Knollenberg et al. |
| 10,921,229 B2 | 2/2021 | Shamir |
| 10,928,293 B2 | 2/2021 | Knollenberg et al. |
| 10,997,845 B2 | 5/2021 | MacLaughlin et al. |
| 11,181,455 B2 | 11/2021 | Bates et al. |
| 11,215,546 B2 | 1/2022 | MacLaughlin et al. |
| 11,231,345 B2 | 1/2022 | Scialo et al. |
| 11,237,095 B2 | 2/2022 | Rodier et al. |
| 11,250,684 B2 | 2/2022 | MacLaughlin et al. |
| 11,255,760 B2 | 2/2022 | Scialo et al. |
| 11,268,930 B2 | 3/2022 | Rodier et al. |
| 11,320,360 B2 | 5/2022 | Lumpkin et al. |
| 11,385,161 B2 | 7/2022 | Bates et al. |
| 11,416,123 B2 | 8/2022 | Pandolfi et al. |
| 11,428,617 B2 | 8/2022 | Knollenberg et al. |
| 11,428,619 B2 | 8/2022 | Knollenberg et al. |
| 11,540,248 B2 | 12/2022 | Scialò et al. |
| 11,576,045 B2 | 2/2023 | Michaelis et al. |
| 11,781,965 B2 | 10/2023 | Karasikov et al. |
| 11,892,462 B2 | 2/2024 | Scialò et al. |
| 11,927,509 B2 | 3/2024 | Scialo et al. |
| 11,946,852 B2 | 4/2024 | Rodier et al. |
| 12,130,222 B2 | 10/2024 | Yates et al. |
| 2005/0024641 A1 | 2/2005 | DeFreez et al. |
| 2009/0244536 A1* | 10/2009 | Mitchell ............ G01N 15/1433 250/573 |
| 2016/0356711 A1 | 12/2016 | Lumpkin et al. |
| 2017/0176312 A1 | 6/2017 | Shamir |
| 2019/0187036 A1* | 6/2019 | Barraclough ...... G01N 15/1031 |
| 2019/0277745 A1 | 9/2019 | Matsuda et al. |
| 2021/0208054 A1 | 7/2021 | Ellis et al. |
| 2021/0381948 A1 | 12/2021 | Rodier et al. |
| 2022/0228963 A1 | 7/2022 | Shamir |
| 2022/0397495 A1 | 12/2022 | Yates et al. |
| 2022/0397519 A1 | 12/2022 | Knollenberg et al. |
| 2023/0009668 A1 | 1/2023 | Scialo et al. |
| 2023/0087059 A1 | 3/2023 | Knollenberg et al. |
| 2023/0112632 A1 | 4/2023 | Michaelis et al. |
| 2023/0236107 A1 | 7/2023 | Moghaddam et al. |
| 2023/0304914 A1* | 9/2023 | Pariseau ................ G01N 15/06 |
| 2024/0027326 A1 | 1/2024 | Karasikov et al. |
| 2024/0159787 A1 | 5/2024 | Scialo et al. |
| 2024/0183759 A1 | 6/2024 | Scialo et al. |
| 2024/0219412 A1 | 7/2024 | Scialo et al. |
| 2024/0230509 A9 | 7/2024 | Ellis et al. |
| 2024/0264066 A1 | 8/2024 | Knollenberg |
| 2025/0093254 A1* | 3/2025 | Behr .................. G01N 15/1459 |

* cited by examiner

SYSTEMS AND METHODS FOR REDUCING FALSE POSITIVE PARTICLE DETECTION EVENTS IN A PARTICLE DETECTOR

CROSS REFERENCE TO RELATED APPLICATIONS

This application claims the benefit of and priority to U.S. Provisional Patent Application No. 63/599,873, filed Nov. 16, 2023, which is hereby incorporated by reference in its entirety.

BACKGROUND OF INVENTION

Advancement of technologies requiring cleanroom conditions has resulted in a need for the detection and characterization of smaller and smaller particles. For example, some industries pursue detection of particles less than 20 nm in size, and in some cases less than 10 nm in size, as they may affect the increasingly sensitive manufacturing processes and products. Similarly, the need for aseptic processing conditions for manufacturing of pharmaceuticals and biomaterials requires accurate characterization of viable and non-viable particles to address compliance standard relating to health and human safety.

Typically, these industries rely on optical particle counters for detection and characterization of small particles. The ability to detect smaller particles requires new approaches for optical particle counting such as systems employing increasing laser powers, shorter excitation wavelengths and more complex techniques such as condensation nuclei counting, which in turn can dramatically increase the cost and overall complexity of devices for detection of nanometer scale particles. These new approaches can also require more frequent calibration and maintenance to provide the necessary reliability and reproducibility.

Various optical particle counters are known in the art, for example, scattered light optical particle counters are provided in U.S. Pat. No. 7,916,293 and transmission/extinction particle counters, including those utilizing structured beams and/or interferometry are provided in US Patent Nos. 7,746,469, 9,983,113, 10,416,069, US Patent Publication Nos. 2019/0277745 and US 20170176312, and PCT international Publication WO 2019/082186. Each of these references are hereby incorporated in their entirety and specifically to illustrate particle counter system components and configurations that are useful for the detection and characterization of small particles.

It can be seen from the foregoing that there is a need in the art for systems and methods that provide enhanced optically sensing particles having small size dimensions.

SUMMARY OF THE INVENTION

Provided herein are systems and methods for the reduction of false-positive particle detection events. The disclosed systems and methods may be particularly useful for particle detectors configured to detect particles as small as 10-20 nm, for which small operating disturbances or other sources of instrument noise can cause significant issues due to the inherent challenges of separating background noise from particle-light interactions for such small particles.

In one embodiment, a method for reducing false-positive particle detection events of an optical particle detector comprises: flowing a particle-containing fluid through a detection region; exposing the fluid in the detection region to a beam of electromagnetic radiation, wherein interaction between particles of the particle-containing fluid and the beam of electromagnetic radiation generates scattered or emitted electromagnetic radiation from the particles; directing at least a portion of the scattered or emitted electromagnetic radiation from the particles onto a photodetector; generating raw particle count data via the photodetector, wherein the raw particle count data includes a plurality of channels, each channel being correlated to a different particle size bin; filtering the raw particle count data to produce filtered particle count data, wherein the filtering comprises: temporarily storing the raw particle count data for a buffering time period; segmenting the raw particle count data into a series of elemental data intervals; examining each elemental data interval for a noise signature; identifying a noise signature in the segmented raw particle count data; in response to the identified noise signature, flagging one or more sequential elemental data intervals as corresponding to a noise event; and removing the one or more flagged elemental data intervals from the raw particle count data to produce the filtered particle count data, and/or generating replacement data and substituting the replacement data for the one or more flagged elemental data intervals to produce the filtered particle count data; periodically reporting a particle measurement output to a user at a reporting interval, wherein the particle measurement output is based on the filtered particle count data; and wherein the reporting interval has a greater time duration than that of the elemental data intervals.

In some embodiments, a method for reducing false-positive particle detection events of an optical particle detector may comprise adjusting the laser power of a laser of the optical particle detector. The laser may be set to operate at a specific output power (usually around 1650 mW) called the laser power set point. The actual laser output power can drift from this laser power set point. To minimize the drift, a laser output power deadband (usually +/−10 mW) may be specified around the laser power set point. If the actual laser output power exceeds the laser power set point +/− the laser power dead band, the laser power may be reset to again operate at the laser power set point.

In some embodiments, a method for reducing false-positive particle detection events of an optical particle detector may comprise adjusting laser power in response to excessive particle counting noise. There is evidence that some lasers become unstable when operated at specific laser power outputs. If an optical particle detector unit experiences excessive particle count noise, a laser abatement algorithm may move the laser power set point to a different power level with the hopes that the new power level results in the laser becoming stable and not generating particle count noise. The amount the laser power set point is adjusted and the maximum excursion from the original laser power set point is programmable. If the laser power adjustment exceeds the maximum allowable laser power set point excursion, the laser power adjustment direction may be switched resulting in the laser power set point being adjusted downward (until the lower laser power adjustment limit is hit) then adjusted upward (until the upper laser power adjustment limit is hit), then repeats the process constantly search for a potential laser power set point setting at which the laser output is stable.

In some embodiments, a method for reducing false-positive particle detection events of an optical particle detector may comprise adjusting laser power in response to excessive laser power variation. Actual laser power may be continuously monitored by the algorithm (at a 0.2 second rate). If the maximum laser power minus the minimum laser power (max-min) during a specified interval exceeds a specified threshold, then laser power set point is also adjusted as described above.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIGS. 4A, 48 and 4C: Show flow diagrams depicting: a ratio check, an even packet, and a rolling average noise determination.

FIG. GA: Shows an oscilloscope screen capture depicting a first example of an increase in RMS laser noise causing a false-positive particle detection event.

Figure 6A:
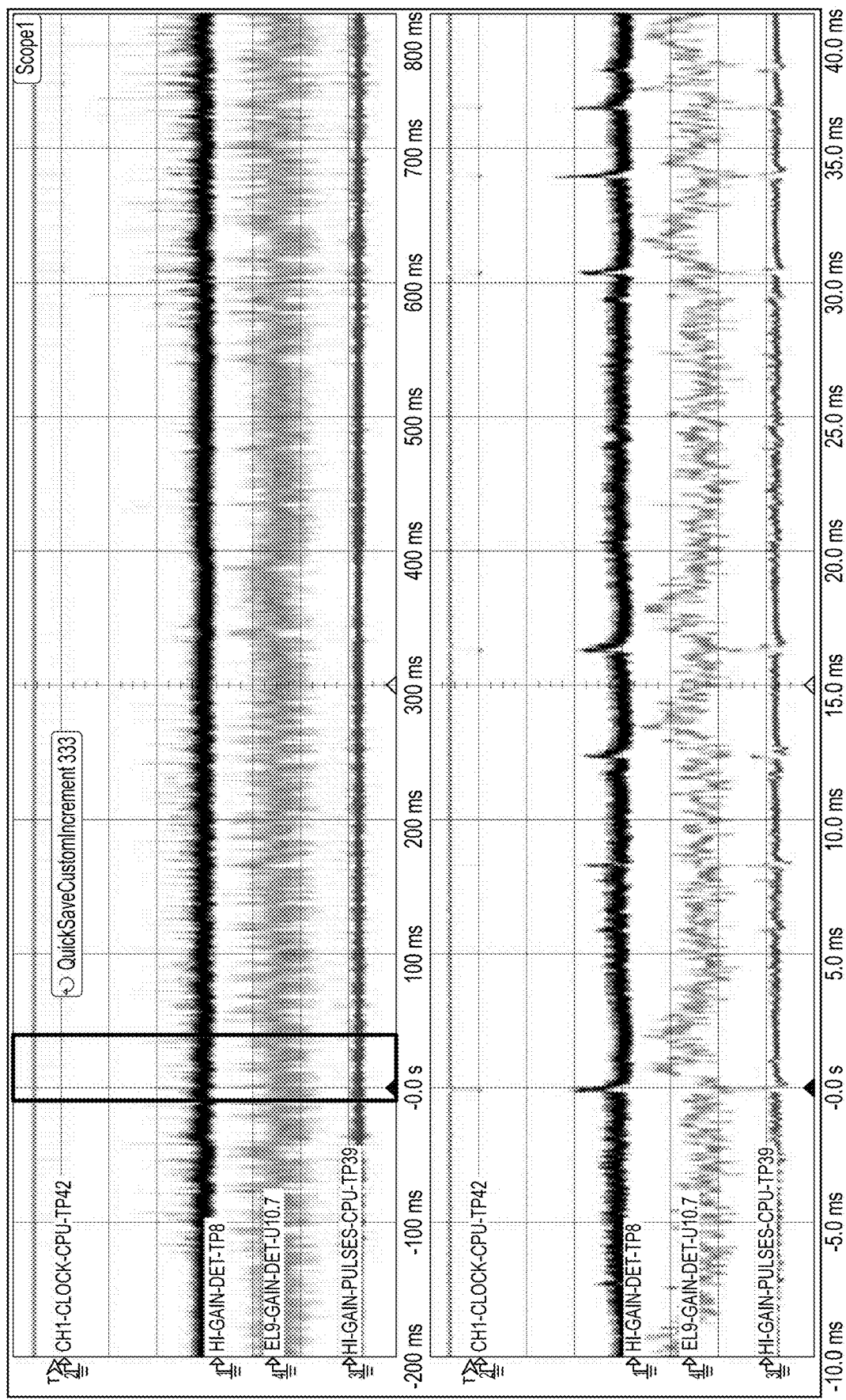
Figure 6B:
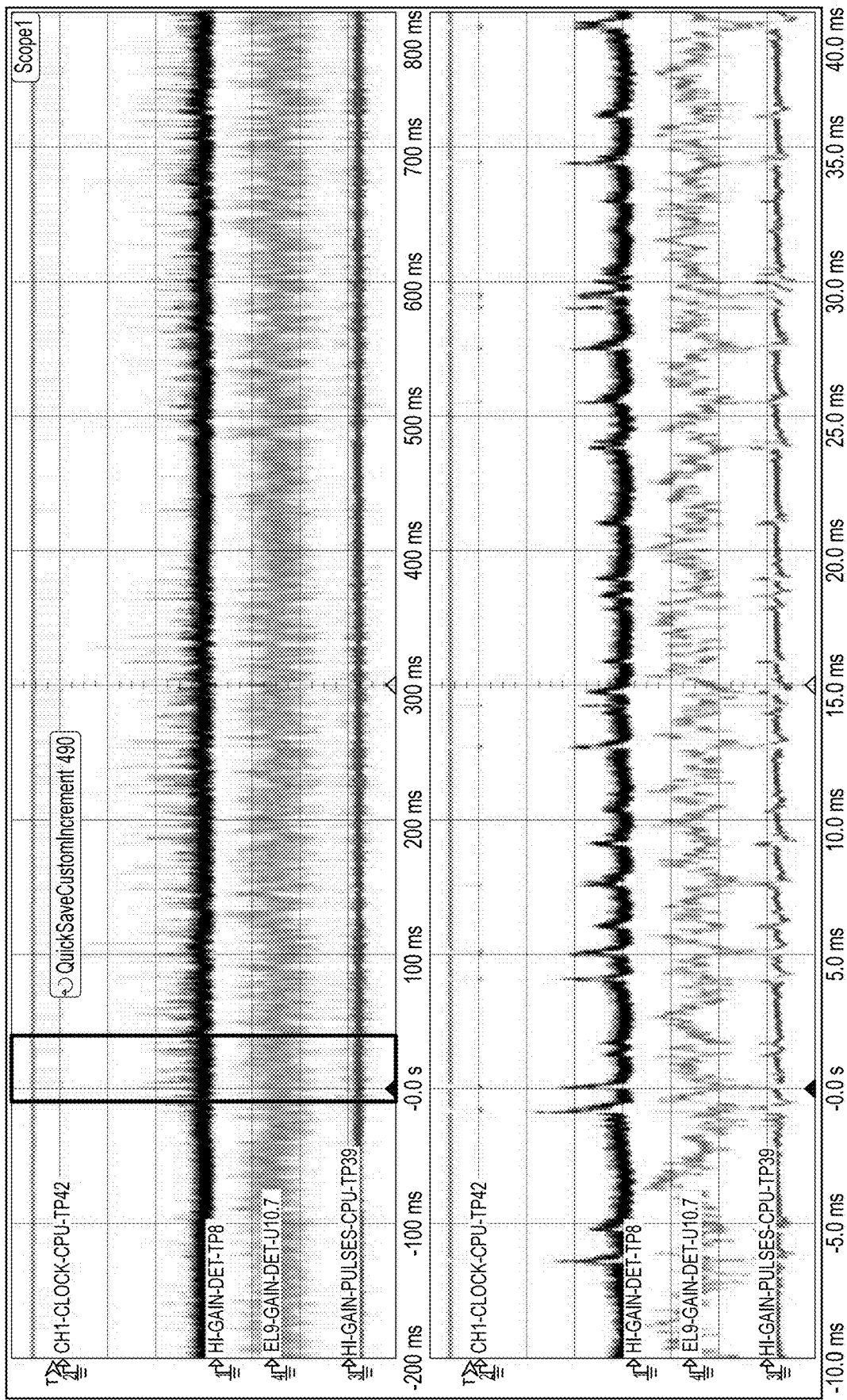

FIG. 6B: Shows an oscilloscope screen capture depicting a second example of an increase in RMS laser noise causing a false-positive particle detection event.

Figure 7:
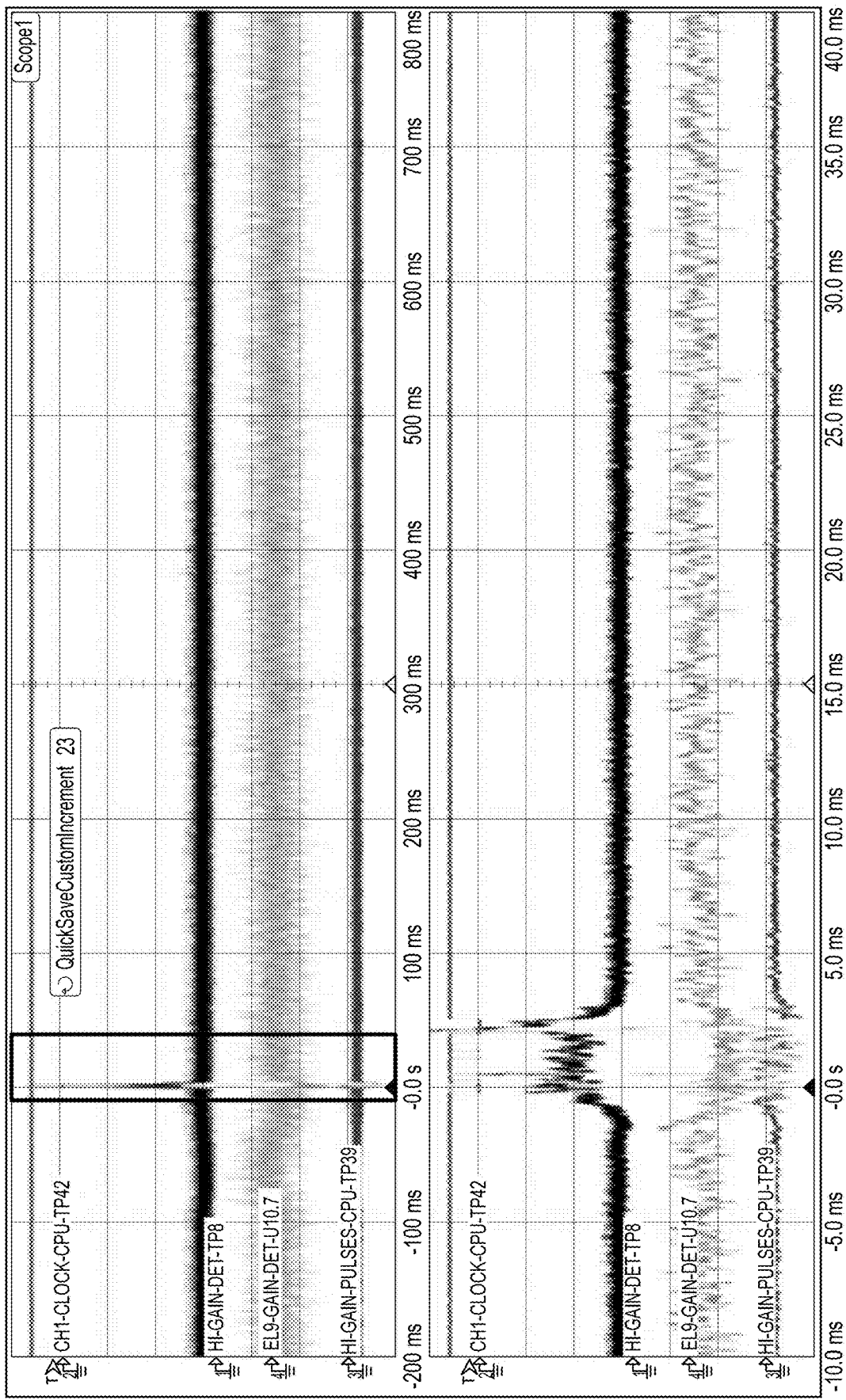

FIG. 7: Shows an oscilloscope screen capture depicting a single abrupt burst of light from the laser causing a false-positive particle detection event.

Figure 8A:
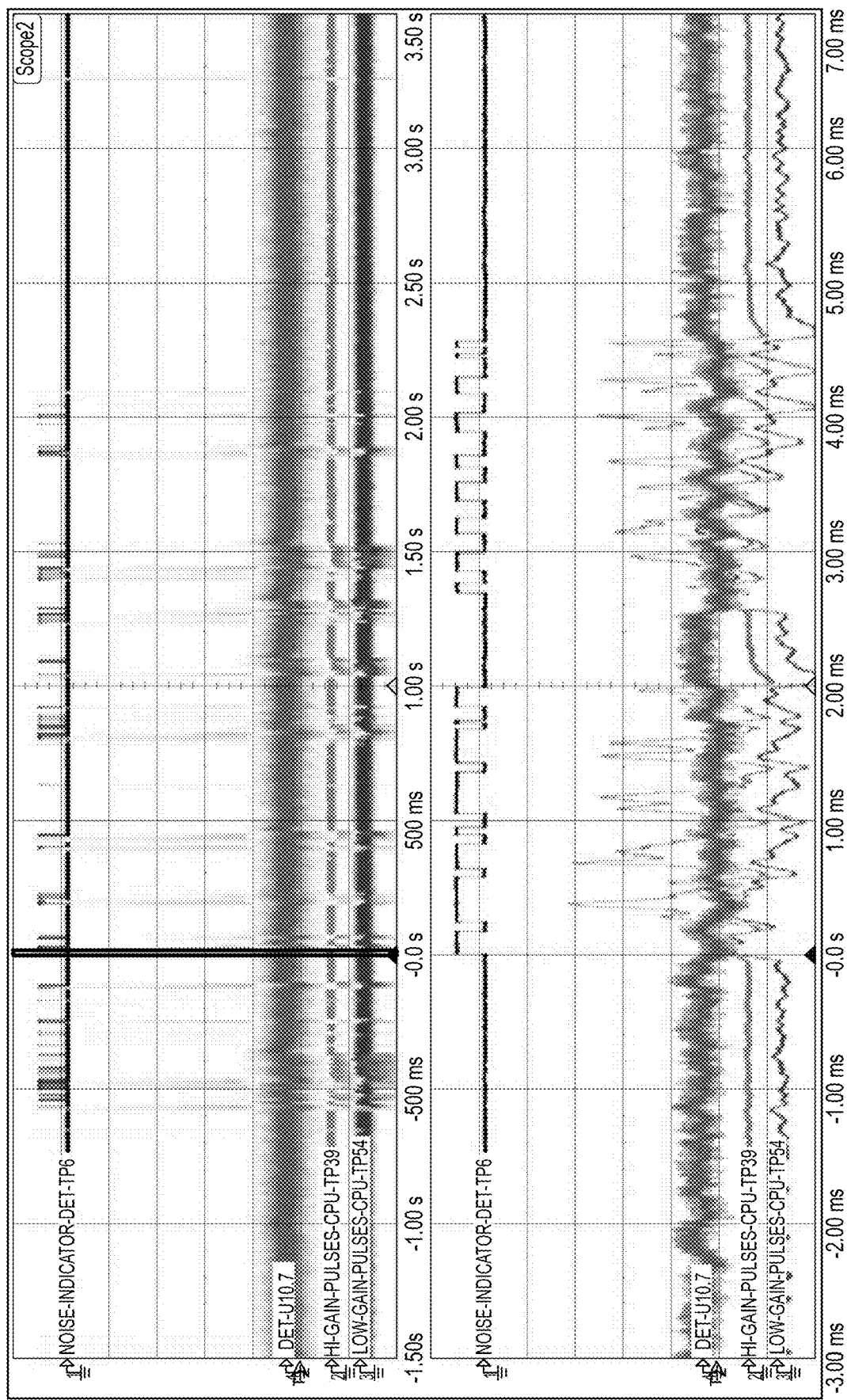

FIG. 8A: Shows an oscilloscope screen capture depicting a first example of the light source oscillating and causing a series of false-positive particle detection events.

Figure 8B:
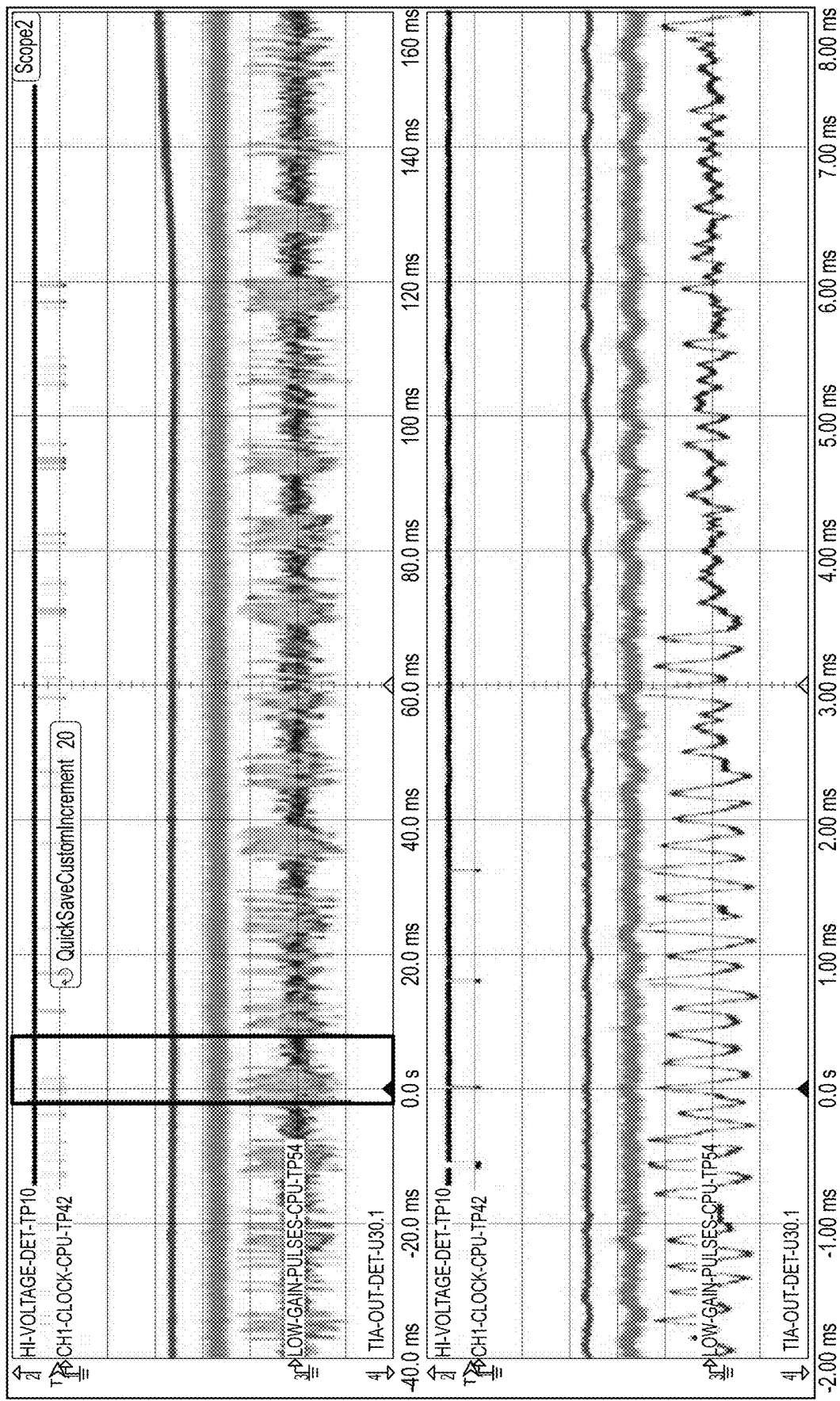

FIG. 8B: Shows an oscilloscope screen capture depicting a second example of the light source oscillating and causing a series of false-positive particle detection events.

Figure 9:
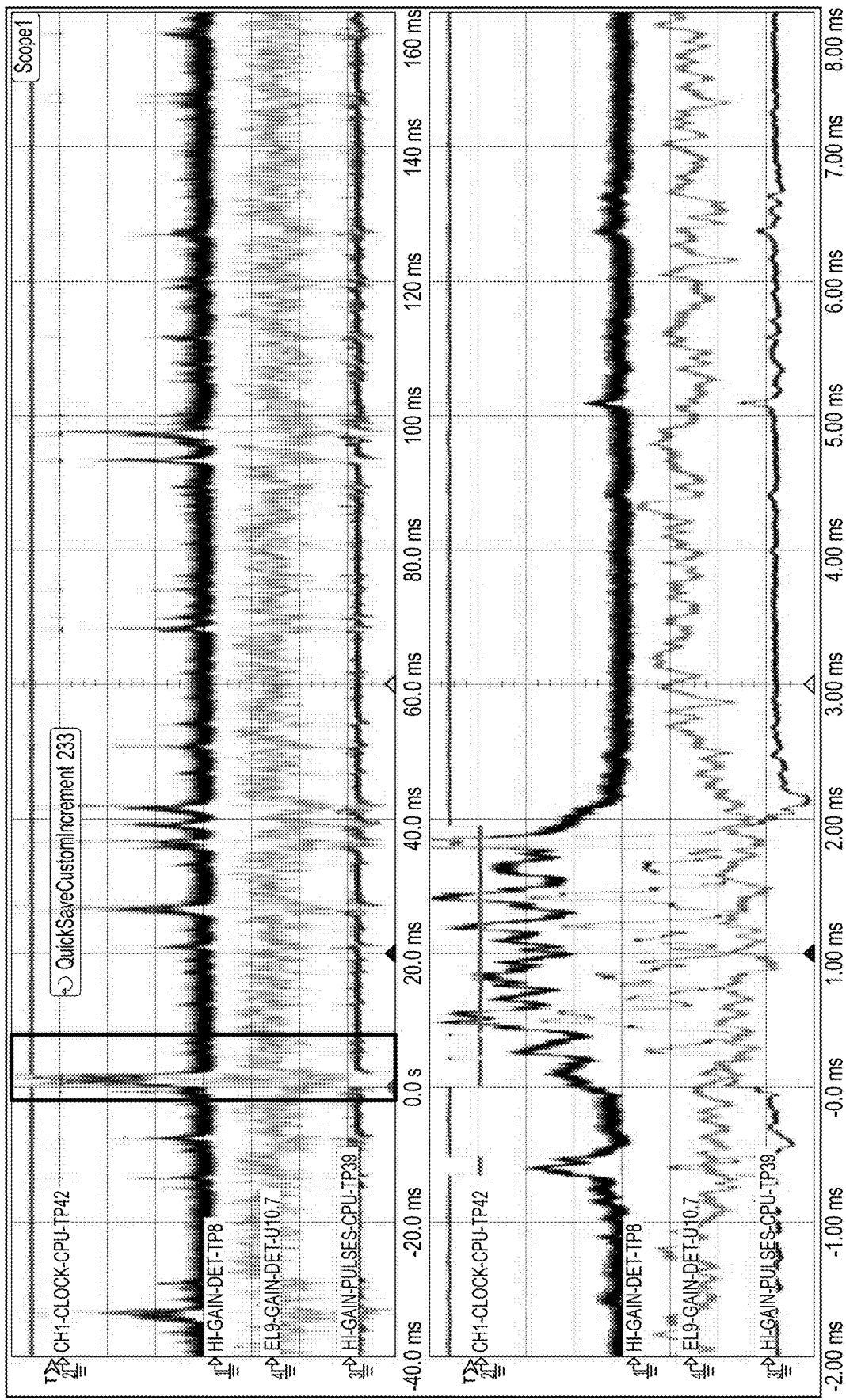

FIG. 9: Shows an oscilloscope screen capture depicting erratic changes in the laser light output causing a false-positive particle detection events.

Figure 10:
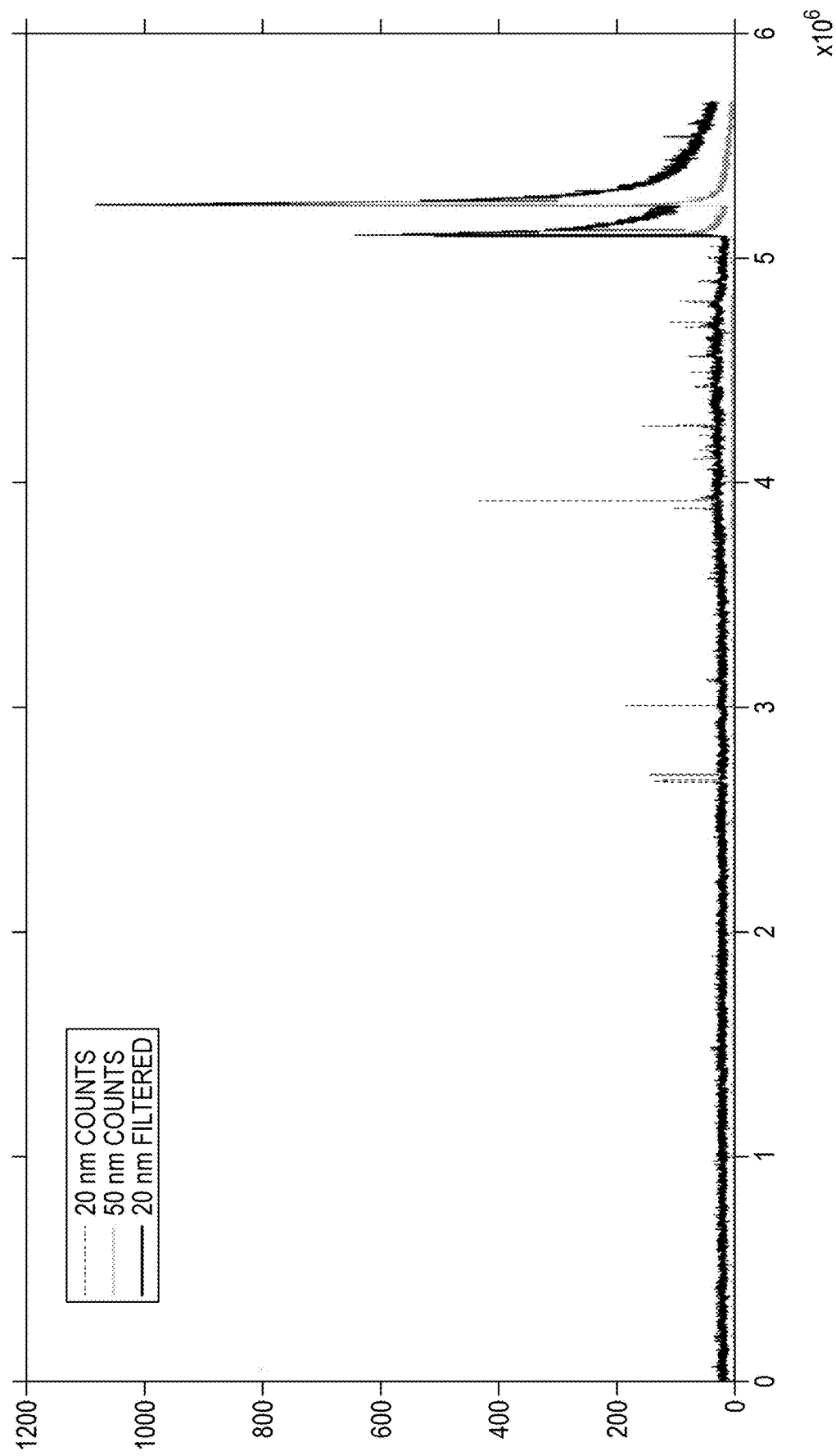

FIG. 10: shows a graph illustrating a first example of the performance of the method for reducing false-positive particle detection events of an optical particle detector.

Figure 11:
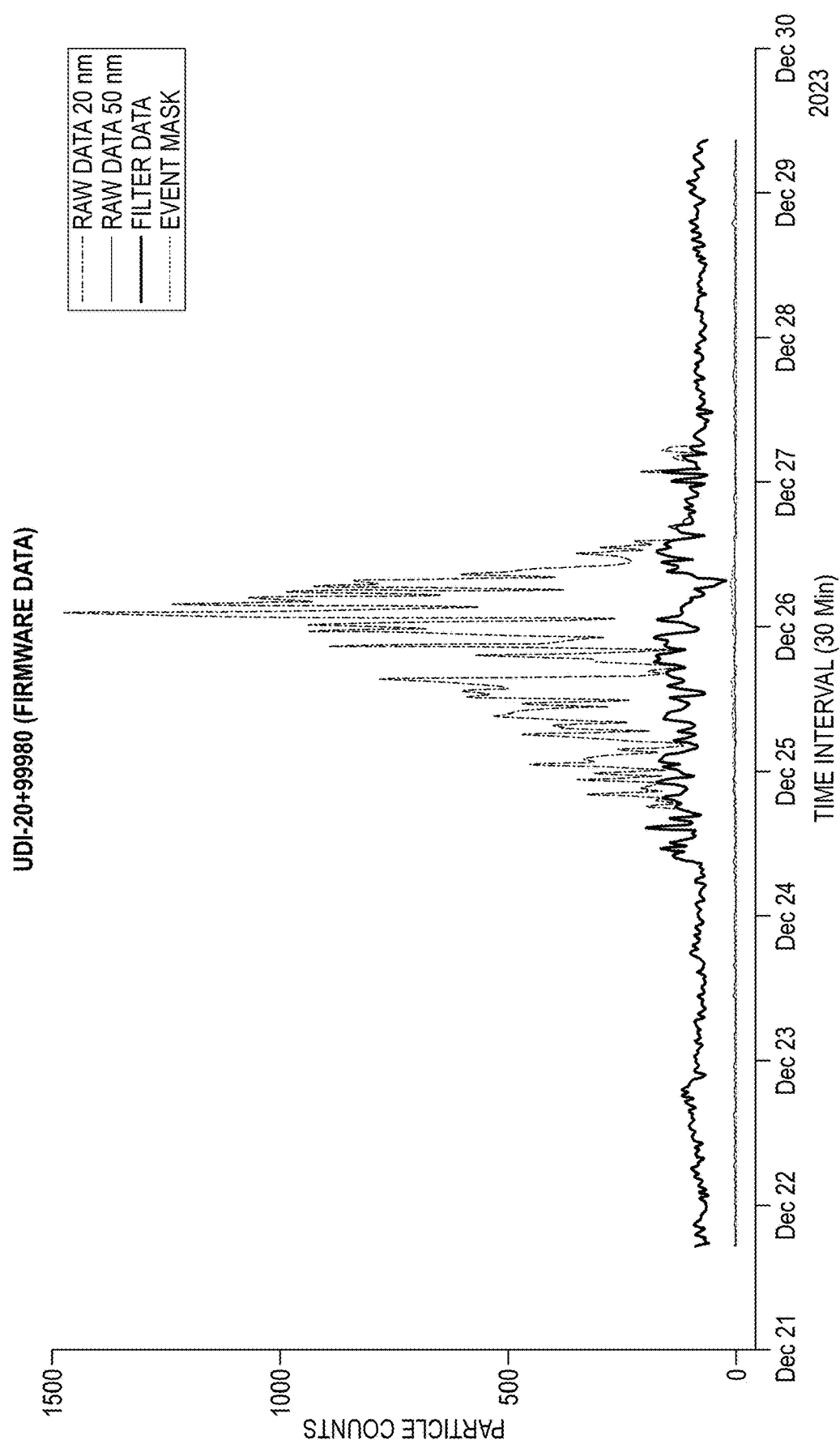

FIG. 11: shows a graph illustrating a second example of the performance of the method for reducing false-positive particle detection events of an optical particle detector.

Figure 12:
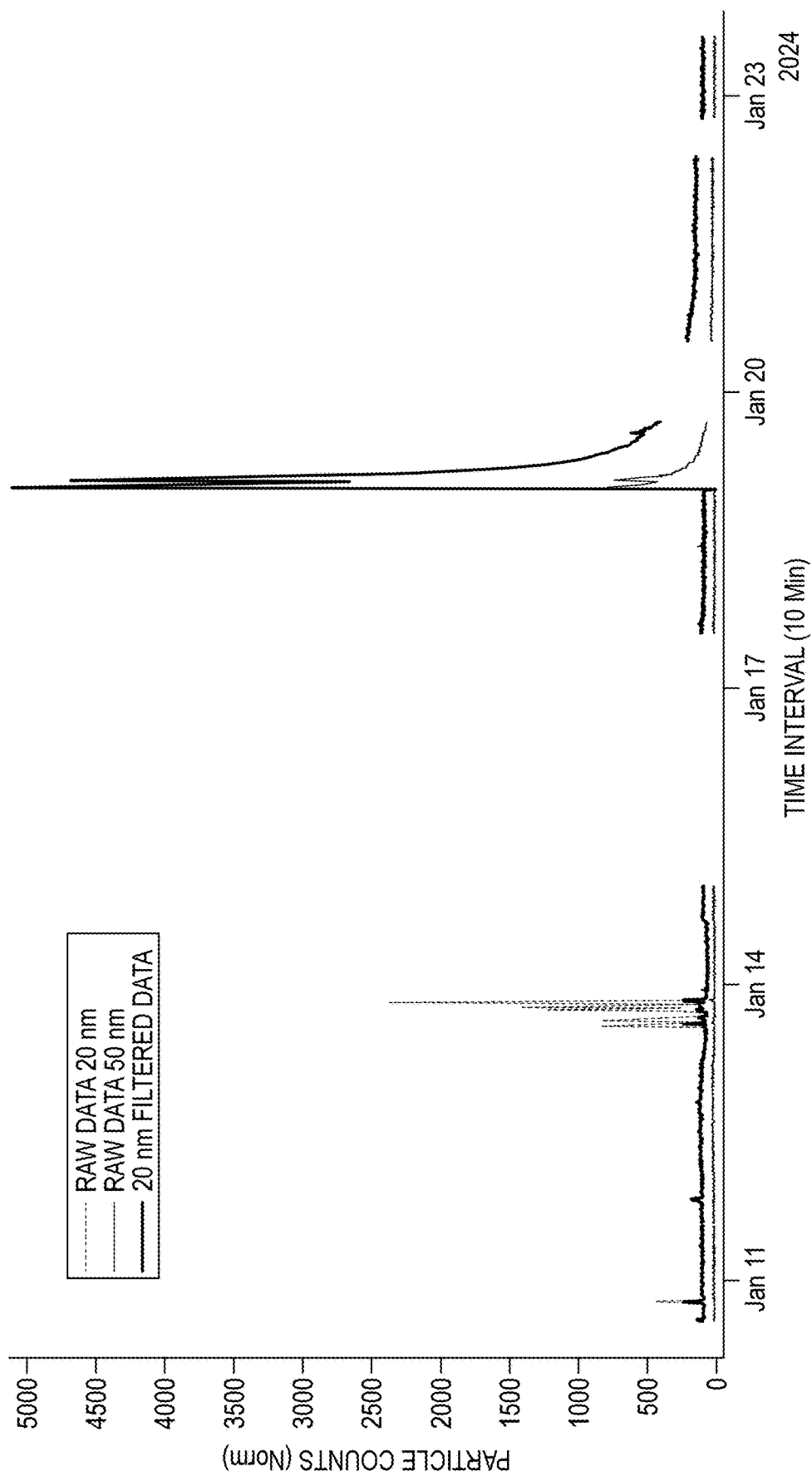

FIG. 12: shows a graph illustrating a third example of the performance of the method for reducing false-positive particle detection events of an optical particle detector.

Figure 13:
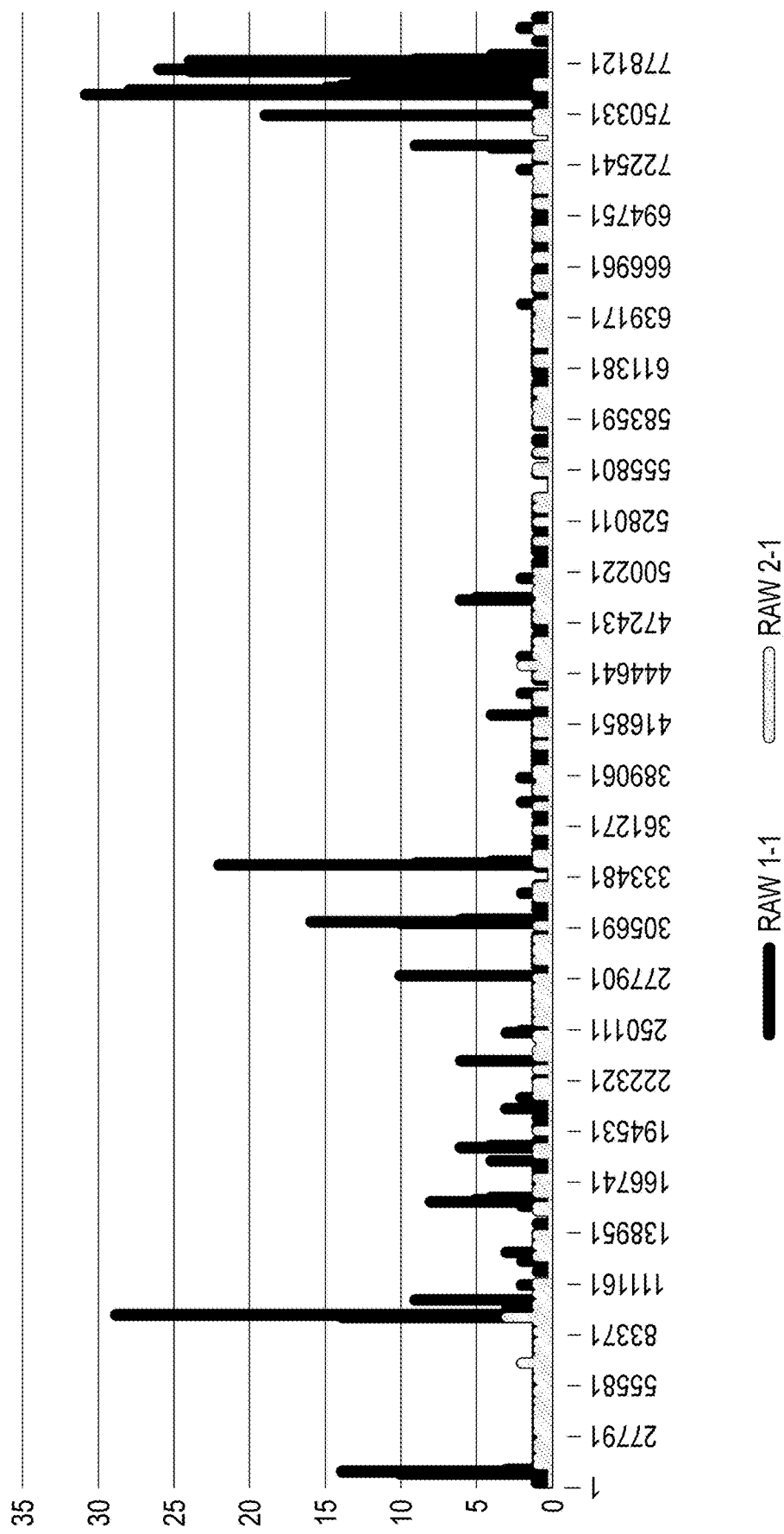

FIG. 13: shows a graph illustrating a fourth example of the performance of the method for reducing false-positive particle detection events of an optical particle detector.

STATEMENTS REGARDING CHEMICAL COMPOUNDS AND NOMENCLATURE

In general, the terms and phrases used herein have their art-recognized meaning, which can be found by reference to standard texts, journal references and contexts known to those skilled in the art. The following definitions are provided to clarify their specific use in the context of the invention.

"Particles" refers to small objects which are often regarded as contaminants. A particle can be any material created by the act of friction, for example when two surfaces come into mechanical contact and there is mechanical movement. Particles can be composed of aggregates of material, such as dust, dirt, smoke, ash, water, soot, metal, oxides, ceramics, minerals, or any combination of these or other materials or contaminants. "Particles" may also refer to biological particles, for example, viruses, spores and microorganisms including bacteria, fungi, archaea, protists, other single cell microorganisms. In some embodiments, for example, biological particles are characterized by a size dimension (e.g., effective diameter) ranging from 0.1-15 µm, optionally for some applications ranging from 0.5-5 µm. A particle may refer to a small object which absorbs, emits or scatters light and is thus detectable by an optical particle counter. As used herein, "particle" is intended to be exclusive of the individual atoms or molecules of a carrier fluid, for example water, air, process liquid chemicals, process gases, etc. In some embodiments, particles may be initially present on a surface, such as a tools surface in a microfabrication facility, liberated from the surface and subsequently analyzed in a fluid. Some systems and methods are capable of detecting particles comprising aggregates of material having a size dimension, such as effective diameter, greater than 20 nm, 30 nm, 50 nm, 100 nm, 500 nm, 1 µm or greater, or 10 µm or greater. Some embodiments of the present invention are capable of detecting particles having a size dimension, such as effective diameter, selected from that range of 10 nm to 150 µm, optionally for some applications 10 nm to −10 µm, optionally for some applications 10 nm to −1 µm, and optionally for some applications 10 nm to −0.5 µm.

The expression "detecting a particle" broadly refers to sensing, identifying the presence of, counting and/or characterizing a particle, such as characterizing a particle with respect to a size dimension, such as effective diameter. In some embodiments, detecting a particle refers to counting particles. In some embodiments, detecting a particle refers to characterizing and/or measuring a physical characteristic of a particle, such as effective diameter, cross sectional dimension, shape, size, aerodynamic size, or any combination of these. In some embodiments, detecting a particle is carried out in a flowing fluid, such as gas having a volumetric flow rate selected over the range of 0.05 CFM to 10 CFM, optionally for some applications 0.1 CFM to 5 CFM and optionally for some applications 0.5 CFM to 2 CFM. In some embodiments, detecting a particle is carried out in a flowing fluid, such as liquid having a volumetric flow rate selected over the range of 1 to 1000 mL/min.

"Optical Particle Counter" or "particle counter" are used interchangeably and refer to a particle detection system that uses optical detection to detect particles, typically by analyzing particles in a fluid flow. Optical particle counters include liquid particle counters and aerosol particle counters, for example, including systems capable of detecting individual single particles in a fluid flow. Optical particle counters provide a beam of electromagnetic radiation (e.g. a laser) into the analysis area, where the beam interacts with any particles and then detects the particles based on scatter, emitted or transmitted light from the flow cell. Detection may focus on electromagnetic radiation that is scattered, absorbed, obscured and/or emitted by the particle(s). Various detectors for optical particle counters are known in the art, including for example, single detection elements (e.g., photodiode, photomultiplier tube, etc.), detector arrays, cameras, various detector orientations, etc. Optical particle counter includes condensation particle counters, condensation nuclei counters, split beam differential systems and the like. When used in the context of a condensation particle counter, the particle counter portion refers to the detection system (e.g. source of electromagnetic radiation, optics, filters, optical collection, detector, processor, etc.). In an embodiment, for example, an optical particle counter comprises a source for generating a beam of electromagnetic radiation, beam steering and/or shaping optics for directing and focusing the beam into a region where a fluid sample is flowing, for example a liquid or gas flowing through a flow cell. A typical optical particle counter comprises of a photodetector, such as optical detector array in optical communication with said flow cell, and collection optics for collecting and imagining electromagnetic radiation which is scattered, transmitted by or emitted by particles which pass through the beam. Particle counters may further comprise electronics and/or processors components for readout, signal processing and analysis of electrical signals produced by the photodetector including current to voltage converters, pulse height analyzers, and signal filtering and amplification electronics. An optical particle counter may also comprise a fluid actuation systems, such as a pump, fan or blower, for generating a flow for transporting a fluid sample containing particles through the detection region of a flow cell, for example, for generating a flow characterized by a volumetric flow rate. Useful flow rates for samples comprising one or more gases include a flow rate selected over the range of 0.05 CFM to 10 CFM, optionally for some applications 0.1 CFM to 5 CFM and optionally for some applications 0.5 CFM to 2 CFM. Useful flow rates for samples comprising one or more liquids include a flow rate selected over the range of 1 to 1000 mL/min.

Detecting and counting small particles (e.g., effective diameter less than 100 nm) in clean and ultraclean fluids in a manner that provides statistically significant data requires high signal-to-noise ratio (S/N). A high S/N ratio allows nanoparticles to be clearly detected above the noise floor. As used herein "statistically significant data" refers to detection of enough particles per unit time to be able to accurately assess contamination levels in the fluid. In some embodiments, high S/N does not relate to sizing accuracy directly. For example, in some optical particle counters the beam waist occupies a small fraction of the flow cell channel, and therefore, this approach monitors a subset of the total flow, such that it is possible for particles to pass through the edge of the beam where irradiance is less than the center. If a 50 nm particle passes through the outer edge of the beam, it may generate a signal similar to a 10 nm particle passing through the center of the beam. Therefore, it is possible for some optical particle counters to have high S/N and be able to detect, for example 20 nm particles, while not having very good sizing accuracy. In some of the present optical particle counters and methods a goal is to be able to count enough particles to provide a quantitative, statistically sound, assessment of contamination levels in ultrahigh purity fluids in the shortest period of time. For example, the current state of the art particle counter may require up to 40 minutes to count enough particles to provide a statistically appropriate concentration (acceptable relative standard deviation) measurement when monitoring a state of the art ultrapure water system. By improving and maintaining a high S/N through the present systems and methods, the time interval needed to measure this minimum statistically acceptable particle counts can be reduced by 10× or more. This provides value as it allows a user to identify deviations from process control limits more quickly.

The term "noise" refers to unwanted modifications of a signal (e.g. a signal of a photodetector) that interfere with the accuracy or precision of a particle detection system. Noise may derive from sources such as backscatter due to interfaces between materials in the optical path of the beam, backscatter due to contamination of optical components, and/or molecular scatter from the fluid in the particle interrogation region from reaching the laser. In some embodiments, noise due to backscatter may result in abnormal electronic signals whose amplitude can exceed a particle detection threshold, resulting in false-positive particle detection events.

The expression "high signal-to-noise ratio" refers to a signal-to-noise ratio of an optical particle detection system sufficient for accurate and sensitive detection of particles in a fluid flow, including particles characterized by a small physical dimension (e.g., an effective diameter of less than or equal to 200 nm, optionally for some embodiments less than or equal to 100 nm and optionally for some embodiments less than or equal to 50 nm). In an embodiment, "high signal-to-noise ratio" refers to a signal-to-noise ratio sufficiently high to sense particles characterized by a small physical dimension, such as particles having an effective diameter as low as 20 nm, optionally for some applications a diameter as low as 10 nm and optionally for some applications a diameter as low as 1 nm. In an embodiment, "high signal-to-noise ratio" refers to a signal-to-noise ratio sufficiently high to accurately detect and count particles with a false detection rate of less than or equal to 50 counts/L, for example, for detection of particles having an effective diameter selected over the range of 1-1000 nm. In an embodiment, "high signal-to-noise ratio" refers to a signal-to-noise ratio sufficiently high to provide a minimum statistically acceptable particle count in a timeframe at least a factor of 10× less than in a conventional optical particle counter. Systems and methods of the present disclosure may provide a high signal to noise ratio.

The expression "interferometric detection of particles" refers to systems and methods using optical interference to detect one or more particles. In some embodiments, coherent beams of electromagnetic radiation are superimposed to cause optical interference for sensing, counting and/or determining a size characterization of a particle that interacts with at least a portion of the electromagnetic radiation.

"Beam propagation axis" refers to an axis parallel to the direction of travel of a beam of electromagnetic radiation.

"Optical communication" refers to components which are arranged in a manner that allows light to transfer between the components.

"Optical axis" refers to a direction along which electromagnetic radiation propagates through a system.

"Light source" refers to a device or device component that is capable of delivering electromagnetic radiation to a sample. The term "light" is not limited to visible radiation, such as by a visible light beam, but is used in a broad sense to include any electromagnetic radiation also inclusive of visible radiation, ultraviolet radiation and/or infrared radiation. The optical source may be embodied as a laser or laser array, such as a diode laser, diode laser array, diode laser pumped solid state laser, LED, LED array, gas phase laser, laser oscillator, solid state laser, to name a few examples.

The term "electromagnetic radiation" and "light" are used synonymously in the present description and refer to waves of electric and magnetic fields. Electromagnetic radiation useful for the methods of the present invention include, but is not limited to ultraviolet light, visible light, infrared light, or any combination of these having wavelengths between about 100 nanometers to about 15 microns.

The term "particle interrogation zone" refers to a zone within a particle detection system where one or more particles interact with the incident beam and/or the pump beam to scatter light. In some embodiments, the particle interrogation zone may comprise a cuvette and/or a flow cell to constrain a particle-containing liquid flowing therethrough. In other embodiments, an unconstrained jet of particle-containing gas may flow through the particle interrogation zone. In still other embodiments, the particle interrogation zone may comprise a surface to be interrogated for particles.

The term "false-positive particle detection event" refers to an error in a particle detection system in which a signal is sent to a user, wherein the signal incorrectly indicates the presence of one or more particles in the particle detection zone. In one aspect, a false-positive particle detection event can be caused by a noise event in the particle detection system. In one aspect, a false-positive particle detection event may include the particle detection system sending a signal to a user, that signal incorrectly indicating the presence of a single particle in the particle detection zone, when in fact there were no particles in the particle detection zone at the point in time associated with the signal. In one aspect, a false-positive particle detection event may include the particle detection system sending a signal to a user, that signal incorrectly indicating the presence of a plurality of particles in the particle detection zone, when in fact there were no particles in the particle detection zone at the point in time associated with the signal. In one aspect, a false-positive particle detection event may include the particle detection system sending a signal to a user, that signal incorrectly indicating the presence of an unusually high concentration of particles in the particle detection zone, when in fact there were no particles in the particle detection zone at the point in time associated with the signal. In other aspects, a false-positive particle detection event may include the particle detection system sending a signal to a user, that signal incorrectly indicating a higher concentration of particles than is accurate. In one aspect, a false-positive particle detection event may be caused by one or more signals generated by a photodetector of the particle detection system, wherein the one or more signals exceed a threshold value, the threshold value being preselected to be sufficiently high to distinguish light associated with the presence of a particle from ordinary background noise received by and/or generated in the photodetector.

The term "noise event" refers to an error in a particle detection system in which a signal is generated by a photodetector of a particle detection system and sent to a processor of the particle detection system, wherein the signal incorrectly indicates the presence of one or more particles in the particle detection zone. In one aspect, the signal generated by the photodetector and sent to the processor may have a plurality of channels, each channel corresponding to a particle size bin. A noise event may occur on just one channel or several channels of the signal generated by the photodetector. In one aspect, a noise event may include the photodetector generating a signal and sending the signal to the processor, that signal incorrectly indicating the presence of a single particle in the particle detection zone, when in fact there were no particles in the particle detection zone at the point in time associated with the signal. In one aspect, a noise event may include the photodetector generating a signal and sending the signal to the processor, that signal incorrectly indicating the presence of a plurality of particles in the particle detection zone, when in fact there were no particles in the particle detection zone at the point in time associated with the signal. In one aspect, a noise event may include the photodetector generating a signal and sending the signal to the processor, that signal incorrectly indicating the presence of an unusually high concentration of particles in the particle detection zone, when in fact there were no particles in the particle detection zone at the point in time associated with the signal. In one aspect, a noise event may be caused by a signal being erroneously generated by a photodetector of the particle detection system, wherein the one or more signals exceed a threshold value, the threshold value being preselected to be sufficiently high to distinguish collected light associated with the presence of a particle from ordinary background noise received by and/or generated in the photodetector. Thus, an erroneous false-positive particle detection signal may be generated by the photodetector an sent to the processor in a noise event. In one aspect, a noise event may be caused by a misalignment between the photodetector and a scattered light focusing system. In one aspect, a noise event may be caused by focused scattered light from bulk liquid being transmitted to the photodetector. In one aspect, a noise event may be caused by scattered light that extends beyond the active photodetector area causing reflection in the detector. In one aspect, a noise event may be caused by a laser RMS noise level being too high. In one aspect, a noise event may be caused by an abrupt change in laser output. In one aspect, a noise event may be caused by an oscillation or change in the beam propagation axis of the laser. In one aspect, a noise event may be caused by an abrupt change in DC light level and/or background noise.

The term "background noise" means noise of the particle detection system that produces a signal that falls below a predetermined threshold value, the threshold value being preselected to be sufficiently high to distinguish collected light associated with the presence of a particle from the ordinary background noise. Thus, in one aspect, background noise may be distinguished from a noise event in that the background noise does not cause a false-positive particle detection event, whereas a noise event does.

The term "noise signature" means one or more characteristics of the signal of a noise event that may be used to distinguish the noise event from a signal caused by the presence of a particle in the particle detection zone. In one aspect, a noise signature may comprise signal characteristics that include one or more ratios of the signal of one channel to that of another channel. For example, it has been observed that some noise events involve the generation of a signal on the first channel incorrectly indicating the presence of a high concentration of particles of the smallest particle size bin, accompanied by signals of other channels for larger particle size bins falling well below the concentration of particles that would be expected for the larger sizes given the high signal of the first channel. The ratios may be calculated over one time interval or many time intervals. In one aspect, a noise signature may comprise signal characteristics wherein the raw particle count for a short sequence of elemental data intervals (e.g., 1-5 elemental data intervals of 100 ms each) is large with respect to neighboring elemental data intervals in a sequential series of elemental data intervals produced by the photodetector. This is based on the observation that correct particle counts generally do not instantaneously or nearly instantaneously jump to high levels, potentially due to physical phenomena like particle dispersion in the bulk liquid. In one aspect, a noise signature may comprise signal characteristics wherein for a relatively longer sequence of elemental data intervals, the total raw particle count is too large with respect to a baseline average and/or historical data. The noise signature may comprise signal characteristics which can be discerned via comparison of short, medium, and long sequences of elemental intervals. In one aspect, a noise signature may comprise signal characteristics wherein absolute rates of change of a raw particle count trend line are too high. In one aspect, a noise signature may comprise signal characteristics wherein comparison of raw particle counts across several channels (e.g., channels corresponding to 20, 50, 70, and 100 nm counts) does not meet specific distribution thresholds. In one aspect, a noise signature may comprise signal characteristics wherein a finite data interval (10 sec to 10 min) having high particle counts is bounded on one or both sides by normal data intervals with normal counts (i.e. roughly equal to the baseline) where all counts in the finite data interval are greater than the baseline.

The term "raw particle count data" refers to unaltered data embodied in the signal produced by the photodetector of a particle detection system. As such, raw particle count data will include any erroneous particle counts resulting from one or more noise events.

The term "filtering", as in "filtering the raw particle count data to produce filtered particle count data", refers to the process of evaluating whether any portions of the stream of raw particle count data received by the photodetector displays one or more noise signatures, and if so, removing the portions of raw particle count data associated with the noise signature to produce filtered particle count data. Thus, the filtered particle count data will generally be a more accurate representation of the true particle concentration of the fluid or medium being sampled as compared to the raw particle count data.

The term "buffering", as in "buffering the raw particle count data", refers to temporarily storing (e.g., storing via random access memory of a processor) a certain amount of raw particle count data to allow time for filtering the raw particle count data into filtered particle count data before using the filtered particle count data to produce a particle measurement output to be periodically reported to a user. In some embodiments, the time interval corresponding to the total amount of buffered raw particle count data is shorter than the reporting interval of the reported particle measurement output reported to the user.

The term "segmenting", as in "segmenting the raw particle count data into a series of elemental data intervals", means receiving a stream of raw particle count data embodied in a signal produced by a photodetector of a particle detection system and dividing the stream of raw particle count data into a series of discrete packets of raw particle count data.

The term "elemental data interval" means a discrete packet of raw particle count data that contains the raw particle count data generated by the photodetector over a given time interval. Thus, in some aspects, an elemental data interval may include data from each channel of the signal generated by the photodetector over the specified time interval. In one aspect, each elemental data interval may have an equal time duration. For example, each elemental data interval may have a duration of 10 ms, 100 ms, 0.5 seconds, or 1 second. In other aspects, the elemental data intervals may have varied durations compared to each other.

The term "flagging", as in "flagging one or more elemental data intervals" means identifying and labeling one or more elemental data intervals as associated with a noise event.

The term "replacement data" means particle count data that may be used to fill in the gaps in the stream of particle count data after one or more elemental data intervals have been removed (e.g., because the one or more elemental data intervals have been flagged as being associated with a noise event). In one aspect, replacement data may be derived from historical average data of the particular particle detector in question. In one aspect, replacement data may be derived from global historical average data across several particle detectors. In one aspect, replacement data may be derived from an interpolation of the data across the gap resulting from the removal of the flagged data.

The term "reporting interval" means the amount of time between the reporting of one particle measurement output (e.g., to a user) and the next. In some aspects, the reporting interval may be adjusted by the user. The time duration of the reporting interval may be significantly longer than that of the elemental time interval. In one aspect, the reporting interval may be, e.g., 1 h, 30 min, 15 minutes, 10 minutes or 1 minute.

The term particle measurement output means particle count information periodically sent from the particle detection system to a user at a reporting interval, the particle count information being based on the filtered particle count data. In one aspect, the particle count information may include particle counts associated with different particle size bins, as derived from the different channels of the photodetector signal. Thus, the particle count information may include information relating to particle concentration and or size distribution over the reporting interval. The particle measurement output may also include a filtering report that indicates at least one of the following: whether any data was removed from the raw particle count data as a result of filtering over the time period associated with particle measurement, whether any replacement data was used to fill gaps in the data, the total time durations of the replacement data used, and/or how the replacement data was derived.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

The present systems and methods may be utilized to identify the occurrence of a noise event and take corrective action before reporting a particle measurement output to a user, thereby reducing or eliminating false-positive particle detection events and enhancing the accuracy of the reported particle measurement output.

In one embodiment, a method for reducing false-positive particle detection events of an optical particle detector comprises: flowing a particle-containing fluid through a detection region; exposing the fluid in the detection region to a beam of electromagnetic radiation, wherein interaction between particles of the particle-containing fluid and the beam of electromagnetic radiation generates scattered or emitted electromagnetic radiation from the particles; directing at least a portion of the scattered or emitted electromagnetic radiation from the particles onto a photodetector;

generating raw particle count data via the photodetector, wherein the raw particle count data includes a plurality of channels, each channel being correlated to a different particle size bin; filtering the raw particle count data to produce filtered particle count data, wherein the filtering comprises: buffering the raw particle count data for a buffering time period; segmenting the raw particle count data into a series of elemental data intervals; examining each elemental data interval for a noise signature; identifying a noise signature in the segmented raw particle count data; in response to the identified noise signature, flagging one or more sequential elemental data intervals as corresponding to a noise event; removing the one or more flagged elemental data intervals from the raw particle count data to produce the filtered particle count data, and/or generating replacement data and substituting the replacement data for the one or more flagged elemental data intervals to produce the filtered particle count data; periodically reporting a particle measurement output to a user at a reporting interval, wherein the particle measurement output is based on the filtered particle count data; and wherein the reporting interval has a greater time duration than that of the elemental data intervals.

In one aspect, data that has been flagged as associated with a noise event may be replaced with calculated baseline information. In another aspect, data that has been flagged as associated with a noise event may be discarded. In some embodiments, when the data is discarded, the reported sample volume may be adjusted accordingly in order to maintain an accurate concentration measurement.

The invention can be further understood by the following non-limiting examples.

Example 1—Sources of Noise Induced False-positive Particle Detection Events

Particle counts (correct or incorrect) in an optical particle detector system are the result of the output of the detector increasing above some set threshold and then decreasing below the threshold. The increase in detector output may be caused by, e.g.:
  the light scattered off a real particle, or
  the light source (e.g., a laser) increasing its output and allowing light scattered from the bulk liquid to exceed the set threshold, or
  the light scattered from the bulk liquid to extend beyond the active area of the detector.

The light source can increase its output in several different ways. Each way may generate a different pattern or characteristic of false particle counts. Examples of these (there may be others) include:
  abrupt change in DC light level;
  increase in RMS noise;
  sudden short duration increase in laser irradiance;
  sudden output oscillations; and/or
  erratic change in output level.

Examples of light source output changes in intensity are shown in FIGS. 5, 6A, 68, 7, 8A, 88 and 9. Each of the examples resulted in the particle measuring system generating false particle counts. Each example is believed to be the result of the laser being very sensitive to changes in temperature.

Inherent Laser Operational Stability Challenges

Operational Stability Issue (1): A laser of a particle detector system may generate its light output from a single laser diode. The output power (and intensity) of the laser diode may be controlled by changing the current supplied to the diode. In one embodiment, a laser may operate by trying to regulate the laser output between an upper set point and a lower set point. If (for example, due to changes in output power due to changes in temperature) the laser output power exceeds the upper set point, the current to the diode is decreased until the output power is below the upper set point. The reverse is true if the laser output drops below the lower set point and the current is increased until the laser output is above the lower set point.

If the laser output is between the upper and lower set points, the laser stops making any changes to the laser diode current and allows the output of the laser to drift or change by itself as a result in changes in temperature. A problem occurs when the laser output drifts and hits either the upper or the lower set point and makes a large correction to the diode current, which in turn causes an abrupt change in the laser output intensity and may cause a noise event and/or false-positive particle detection event.

Operational Stability Issue (2): in some embodiments, a laser of particle detector system may exhibit the following behavior: if the laser diode temperature is exactly at one particular point, it may go unstable and cause the output of the laser to also become unstable. The temperature at which the laser goes unstable may be 1) unknown, 2) different for each laser, and 3) changes over time. If the laser diode is at a temperature which is causing it to go unstable, the only way to eliminate the instability is to change the temperature of the laser diode via a laser temperature perturbation.

Operational Stability Issue (3): In one embodiment, a laser of a particle detection system may have two critical active components: one is a laser diode and the other is an optical component configured for second-harmonic generation (e.g., an SHG crystal) that takes the output of the photodiode and changes its wavelength. Both of these components are very temperature sensitive and have internal temperature controls to keep them at specific temperatures. In one embodiment, each component has its own independent, closed-loop temperature control system. In one aspect, each of these components may have an independent, specific temperature where they operate at peak performance. If the temperature set point for either of these devices is not at the optimal temperature, the laser can be sensitive to temperature fluctuations and become unstable.

The temperature set point for both of these components may be optimized via a laser optimization routine. In addition, the optimal operating temperature can change over time, which may require the temperature controllers for both of the devices to be reoptimized periodically.

Example 2A—Noise Events

In view of the above, in one aspect, a particle detection system may sometimes report erroneous high particle counts, e.g., due to noise events, which may cause users to perform unnecessary maintenance or troubleshooting on their process lines. The following monitoring modes of the particle detector may be disrupted by a noise event:
  a. Normal operation (most common) and corresponding low level steady state particle detections, e.g.: 20 nm particle counts <500 cnts/ml. During normal operation, the particle detection system may monitor a fluid for particle concentration abnormalities (e.g., slow or sudden rise in particle counts indicating an issue in the fluid system) and periodically report an output to the user. False-positive particle detection events when a fluid system is operating normally may cause unwarranted process shutdowns and/or corrective actions to be taken.

b. A rise in correct particle counts due to a physical event (e.g., a mechanical failure somewhere in the system being monitored) causing increased particles flowing though the particle detector. False-positive particle detection events during or near-in-time to a true rise in particle counts may obscure the true rise in particle counts, as the user may incorrectly assume all of the counts are due to noise.

c. Falling particle counts as collection lines are flushed out.

Example 2B—Potential Characteristics of True Particle Count Data

In one example, users may typically receive normalized count updates at reporting intervals of every 10 to 30 minutes via a particle measurement output. In one aspect the normalized count updates may have the following features:

a. Rates are normalized to counts/ml.

b. Sampled Volumetric Rate through the system, i.e., the volume/time of particle-containing fluid that passes through the laser beam and is interrogated for particles, is assumed to be 0.45 ml/minute.

c. Particle counts are captured every 100 ms, accumulated, and then normalized for reporting.

Table 1 shows a range of particle count rates expressed in various different units. A Sampled Volumetric Rate of 0.45 ml/min is assumed.

TABLE 1

Flow Rate Comparison

| Cnts/ml | Cnts/Min | Cnts/Sec | Cnts/100 ms | 100 ms/Cnt |
|---|---|---|---|---|
| 132000 | 59400 | 990.00 | 99.000 | 0.01 |
| 100000 | 45000 | 750.00 | 75.000 | 0.01 |
| 50000 | 22500 | 375.00 | 37.500 | 0.03 |
| 20000 | 9000 | 150.00 | 15.000 | 0.07 |
| 10000 | 4500 | 75.00 | 7.500 | 0.13 |
| 5000 | 2250 | 37.50 | 3.750 | 0.27 |
| 1333 | 600 | 10.00 | 1.000 | 1.00 |
| 1000 | 450 | 7.50 | 0.750 | 1.33 |
| 667 | 300 | 5.00 | 0.500 | 2.00 |
| 500 | 225 | 3.75 | 0.375 | 2.67 |
| 444 | 200 | 3.33 | 0.333 | 3.00 |
| 100 | 45 | 0.75 | 0.075 | 13.33 |
| 50 | 23 | 0.38 | 0.038 | 26.67 |
| 10 | 5 | 0.08 | 0.008 | 133.33 |

It has been observed that in certain applications of particle detection systems, under normal steady state conditions, counts do not occur very often per every 100 ms elemental data interval. In other words, any 100 ms interval with a count greater than 1 represents a relatively high counts/ml rate. Furthermore, any longer time interval with an average count greater than 1 represents a relatively high counts/ml rate. Such observations can be useful in distinguishing true particle counts from noise events.

Table 2 shows data collected from two units under test. Particle-containing DI water was used as the test fluid. It was observed that the units did not exhibit any "spiking events" (i.e., rapid bursts of noise events) or other readily identifiable symptoms of noisy operation during the testing, thus the reported data was deemed to be true particle count data.

TABLE 2

Size Distribution for Two Units Monitoring DI Water

| | | Duration | | Total Counts | | | | Counts Above 1 | |
|---|---|---|---|---|---|---|---|---|---|
| Unit | Date | Entries | Time Hrs | 20 nm | 50 nm | 70 nm | 100 nm | 20 nm | 50 nm |
| 99980 | May 28, 2023 | 1013029 | 28.13569 | 3676 | 1354 | 142 | 14 | 10 | 1 |
| 99980 | Sep. 30, 2023 | 1048576 | 29.12711 | 4014 | 1485 | 168 | 13 | 11 | 0 |
| 99980 | Oct. 2, 2023 | 917875 | 75.35764 | 4052 | 1530 | 204 | 8 | 13 | 1 |
| 99980 | Oct. 3, 2023 | 865644 | 24.04567 | 3953 | 1480 | 194 | 7 | 3 | 0 |
| | | | Total | 15695 | 5849 | 708 | 42 | | |
| 99981 | Oct. 3, 2023 | 852456 | 23.07794 | 5201 | 1832 | 263 | 26 | 19 | 1 |
| 99981 | Sep. 30, 2023 | 1048576 | 26.12711 | 6656 | 2320 | 405 | 59 | 30 | 5 |
| 99981 | Sep. 29, 2023 | 835713 | 23.15859 | 7720 | 2628 | 464 | 100 | 34 | 3 |
| | | | Total | 13587 | 6780 | 1132 | 185 | | |

| | Counts Above 1 | | max Counts | | | |
|---|---|---|---|---|---|---|
| Unit | 70 nm | 100 nm | 20 nm | 50 nm | 70 nm | 100 nm |
| 99980 | 0 | 0 | 2 | 2 | 1 | 1 |
| 99980 | 0 | 0 | 3 | 1 | 1 | 1 |
| 99980 | 0 | 0 | 2 | 2 | 1 | 1 |
| 99980 | 0 | 0 | 2 | 1 | 1 | 1 |
| 99981 | 0 | 0 | 2 | 2 | 1 | 1 |
| 99981 | 1 | 0 | 5 | 3 | 2 | 1 |
| 99981 | 0 | 0 | 2 | 2 | 1 | 1 |

| 1 Channel Separation | | 20/50 | 50/70 | 70/100 |
|---|---|---|---|---|
| Expected Ratio | $d^{-3}$ | 15.63 | 2.74 | 2.92 |
| Actual Ratio | 99980 | 1.68 | 7.26 | 15.86 |
| Actual Ratio | 99981 | 1.89 | 4.99 | 5.12 |

TABLE 2-continued

| Size Distribution for Two Units Monitoring DI Water | | | |
| --- | --- | --- | --- |
| 2 Channel Separation | | 20/70 | 50/100 |
| Expected Ratio | d^−3 | 42.88 | 8.00 |
| Actual Ratio | 99980 | 21.17 | 138.26 |
| Actual Ratio | 99981 | 16.30 | 35.65 |
| 3 Channel Separation | | | 20/100 |
| Expected Ratio | d^−3 | | 125.00 |
| Actual Ratio | 99980 | | 373 |
| Actual Ratio | 99981 | | 105 |

Table 2 shows actual particle count distribution of 20, 50, 70, and 100 nm particles over several days of monitoring. As can be seen from Table 2, the real-world particle size distribution for the particles of DI water being measured for these units is not well approximated by a theoretical $d^{-3}$ particle size distribution. Nevertheless, the data clearly shows that 20 nm particle counts occur significantly more often than 50, 70, or 100 nm particle counts.

Example 3—Noise Signatures in Raw Particle Count Data: Distinguishing Noise from True Particle Counts In one aspect, the following assumptions may be useful in methods for reduction of false-positive particle detection events:
(a) Noise events and purposeful injecting of a high concentration of particles have similar count profiles. As such, in some aspects, no attempt is made to identify and separate noise events from particle injections.
(b) It is likely not physically possible for particle counts to change at large rates instantaneously. During actual high count particle events (>1000 cnt/ml), it has been observed that particle counts generally ramp up (quickly) and then ramp down (slowly). Particle count baseline is the average actual particle count at any given moment.
(c) In some aspects, the method must be able to run on an internal CPU of an existing particle detector system in the field. As such, complex data modeling, feature extraction, or data processing may not possible.
(d) In some aspects, noise events may only add counts.

In one aspect, one or more of the following characteristics may be used to distinguish noise events from normal particle counts:
(a) A short (1-5) 100 ms interval total count that is large with respect to its near neighbors tend to suggest a noise event.
(b) Any larger interval total counts that are large with respect to the baseline tend to suggest a noise event.
(c) Comparing short, medium, and long intervals may reveal a noise signature.
(d) Relatively high absolute rates of change of the particle count trendline may tend to suggest a noise event.
(e) Any time interval where the ratio of 20, 50, 70, and 100 nm counts does not meet specific distribution thresholds may tend to suggest a noise event.
(f) Any finite duration interval (10 sec to 10 min) bounded by normal interval with normal counts (i.e. equal to the baseline) where all counts are greater than the baseline may tend to suggest a noise event.

Figure 1:
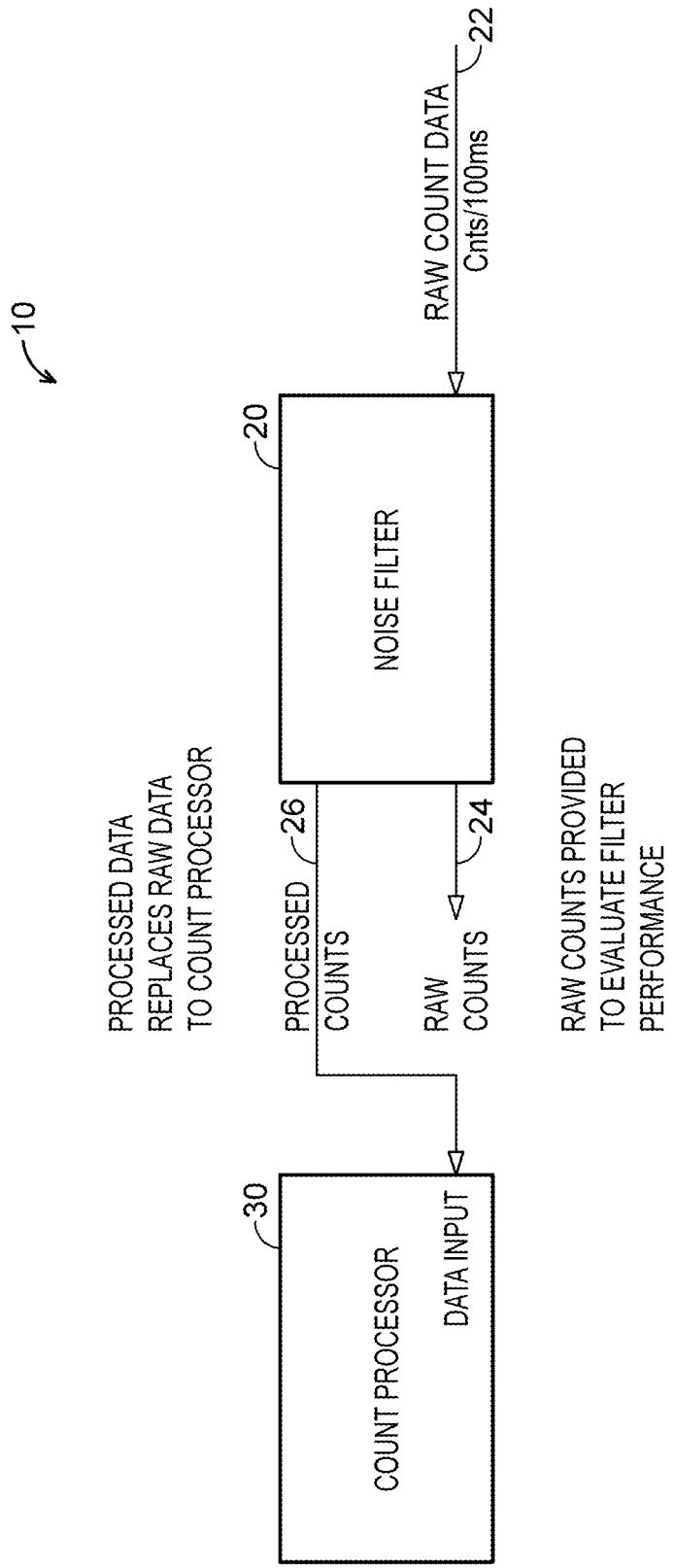
FIG. 1: Is a schematic diagram of a method of filtering raw particle count data in accordance with one aspect of the present disclosure.
Figure 2:
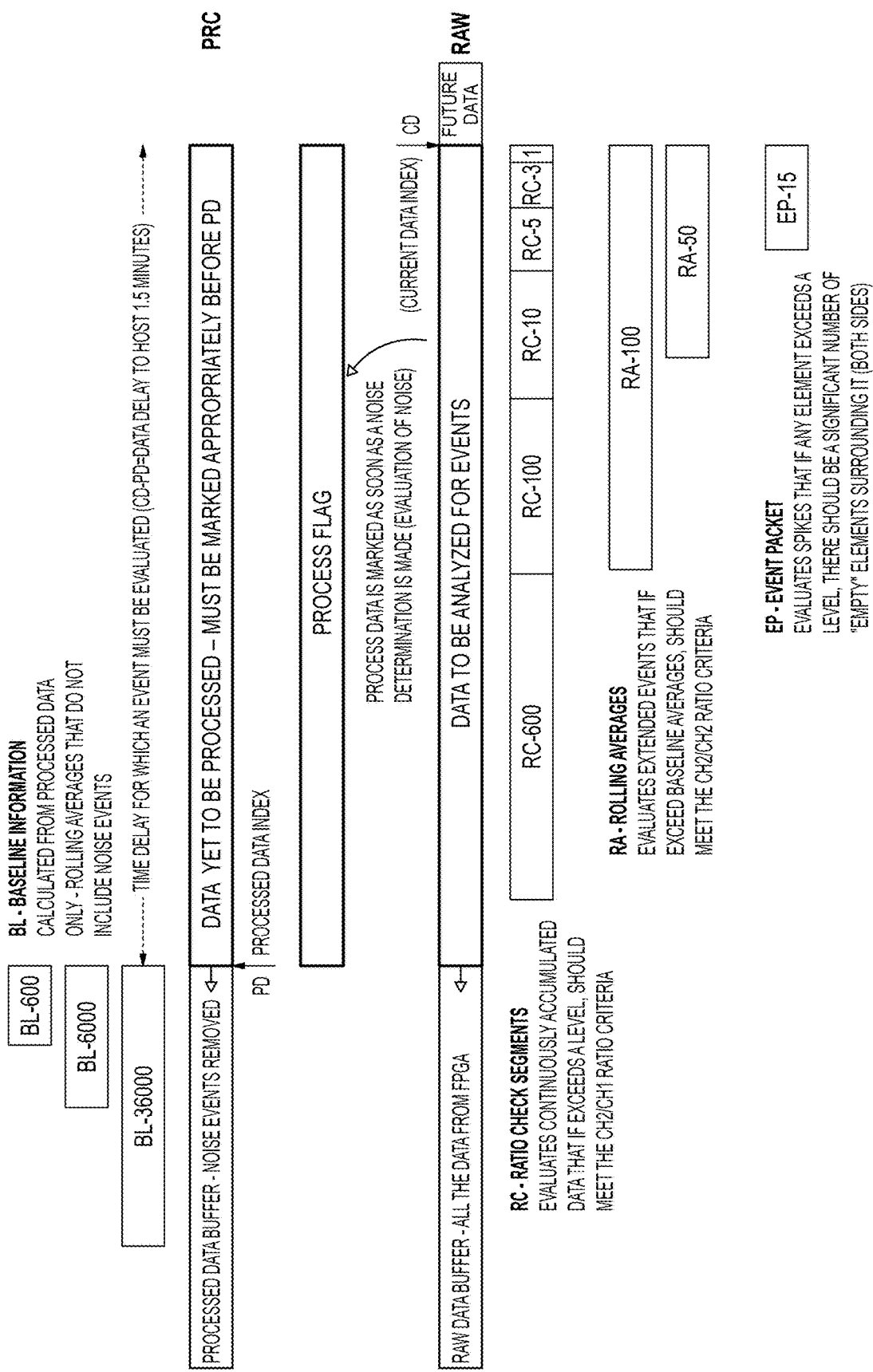
FIG. 2: Is a schematic illustration of the relationship of various data intervals to each other in accordance with one aspect of the present disclosure.
Figures 3A, 3B:
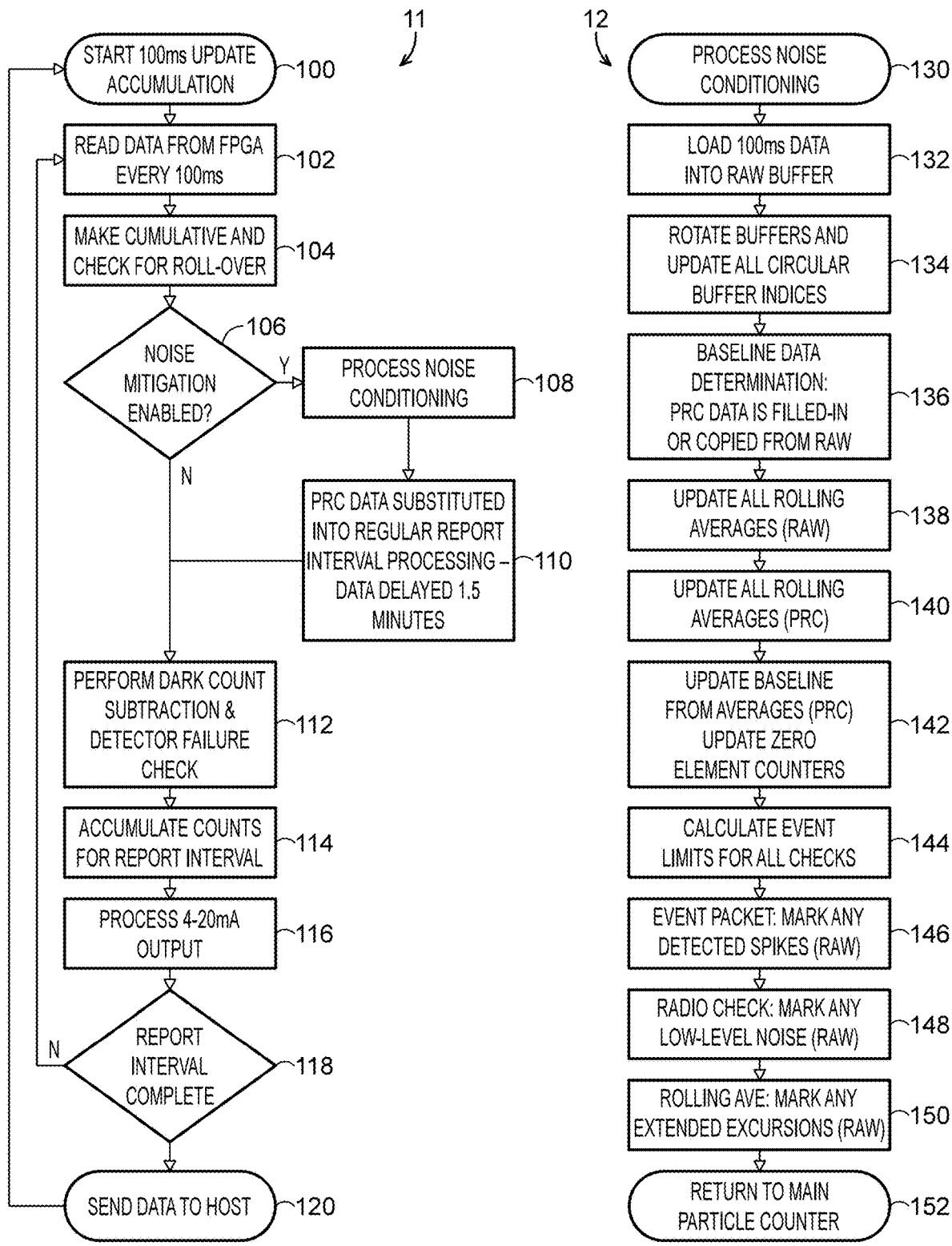
FIGS. 3A, 3B and 3C: Show flow diagrams depicting: periodically reporting a particle measurement output to a user, process noise conditioning, and baseline data determination.
Figure 3C:
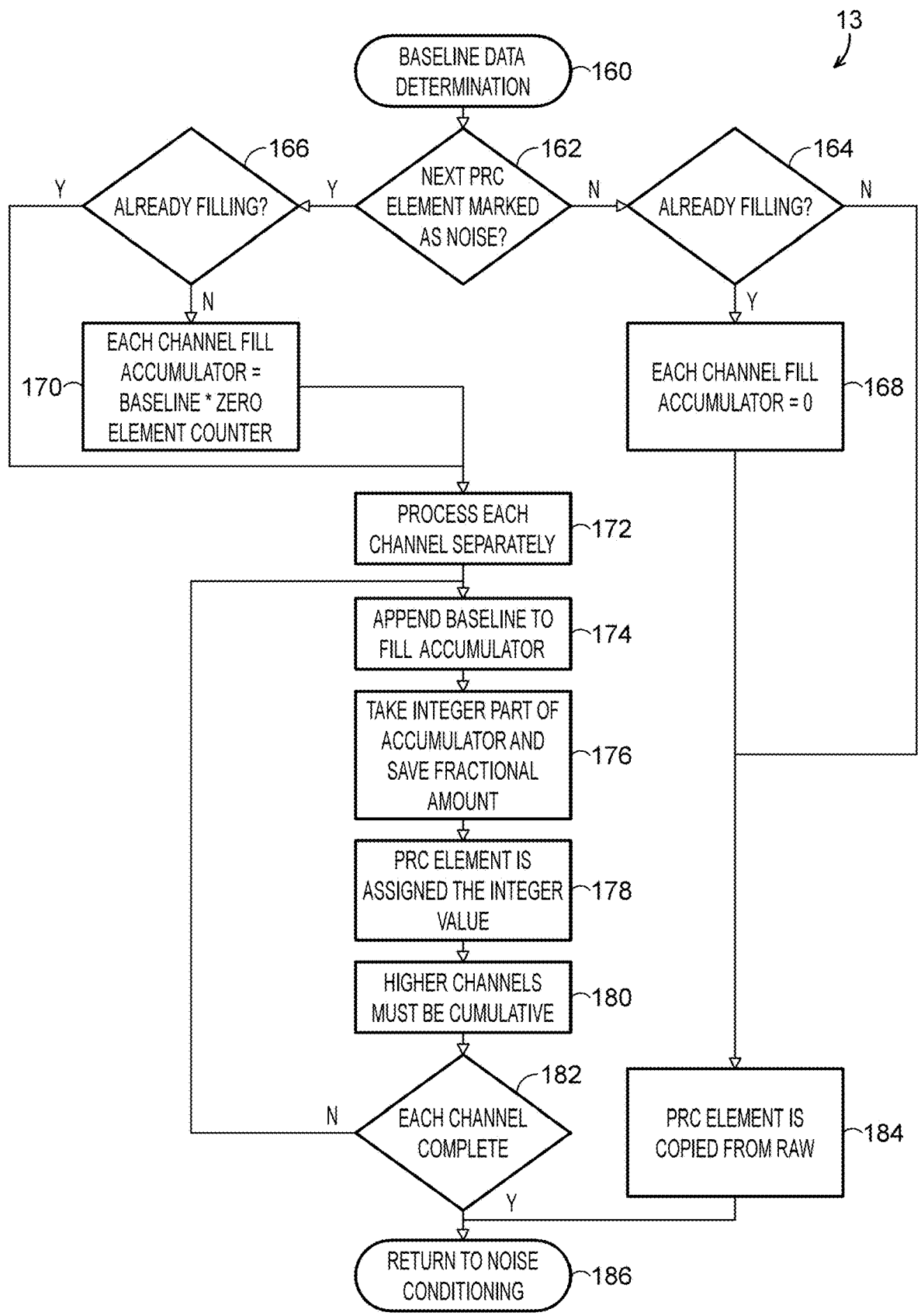
Figure 4A:
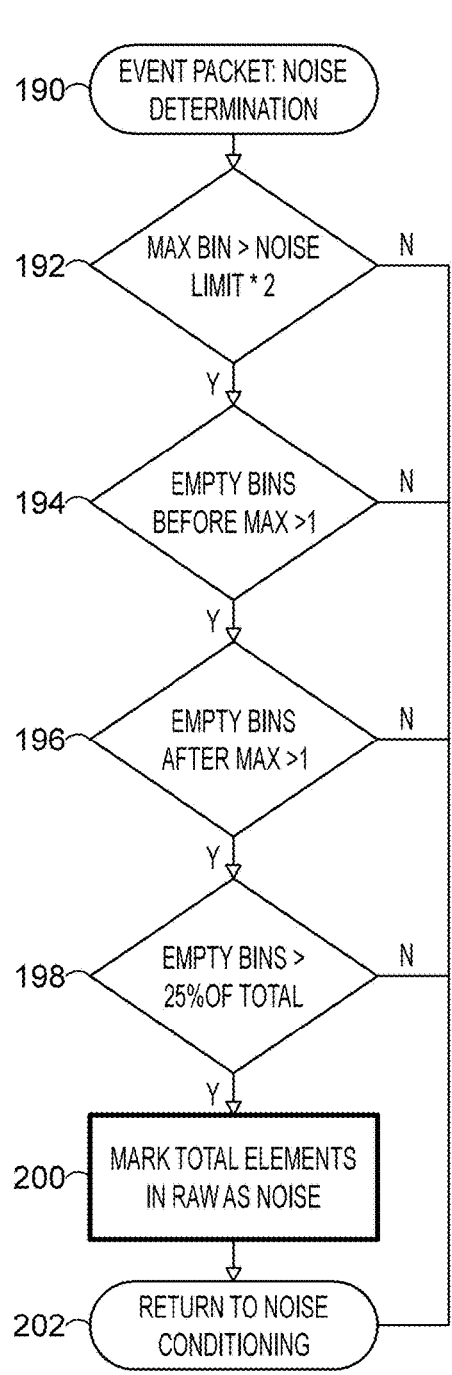
Figure 4B:
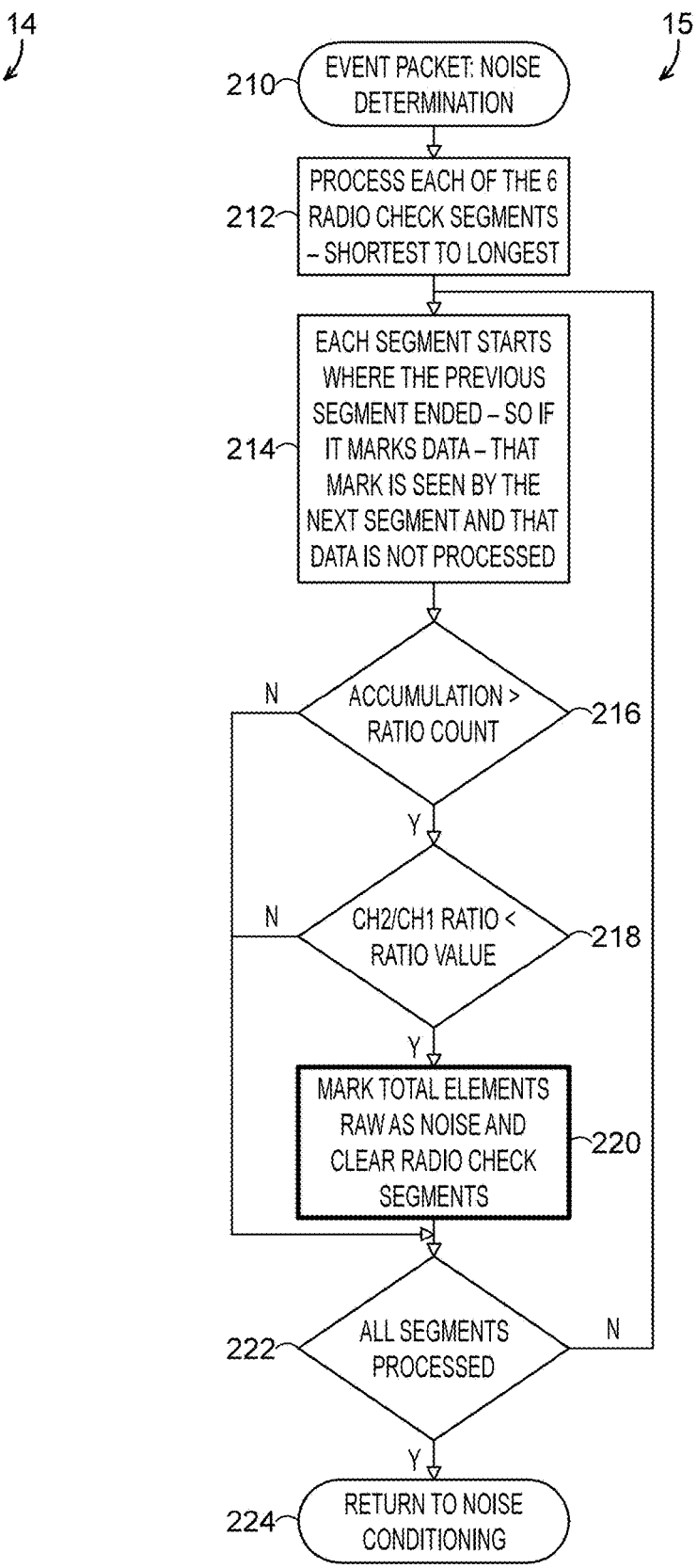
Figure 4C:
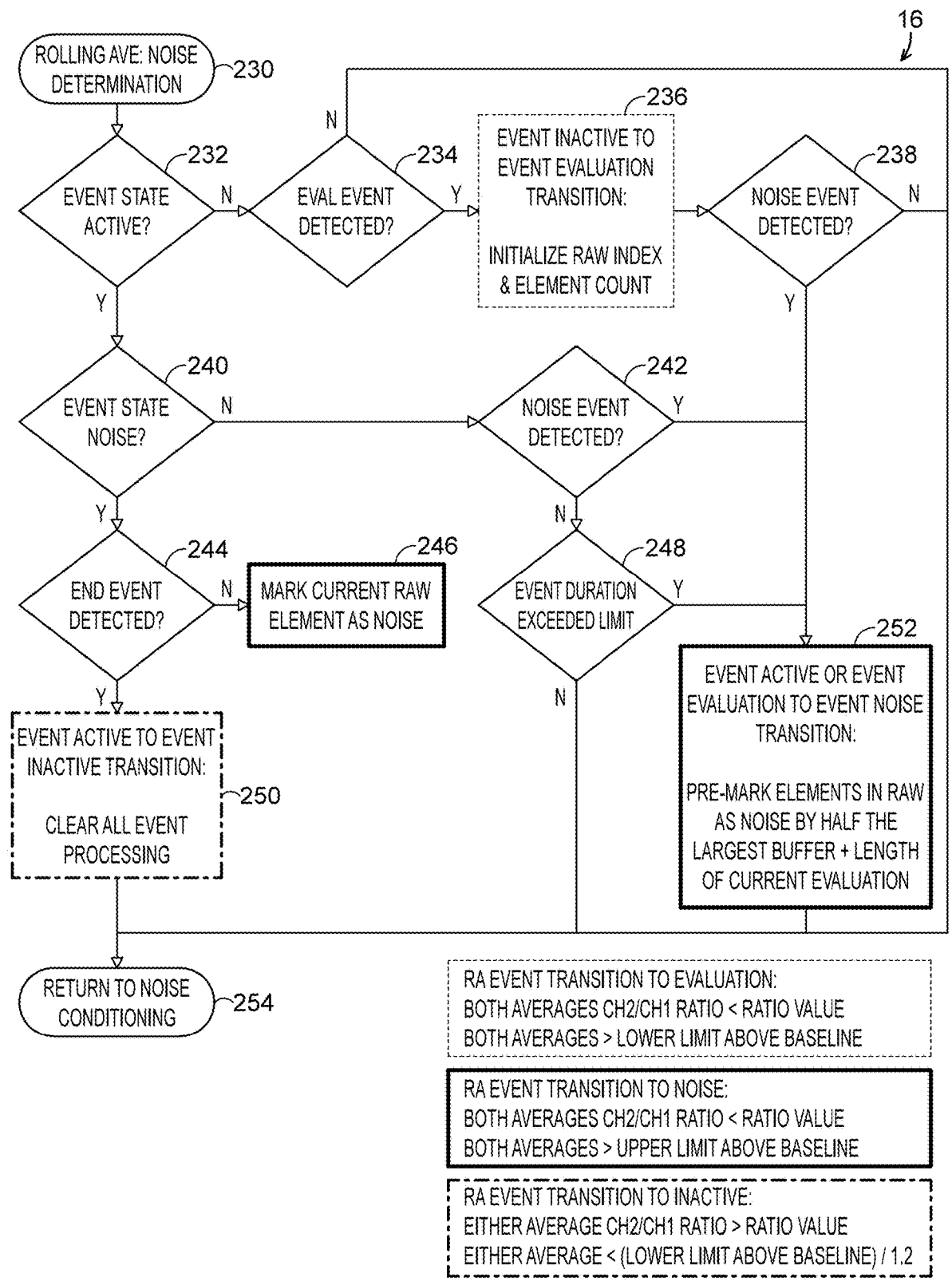
Figure 5:
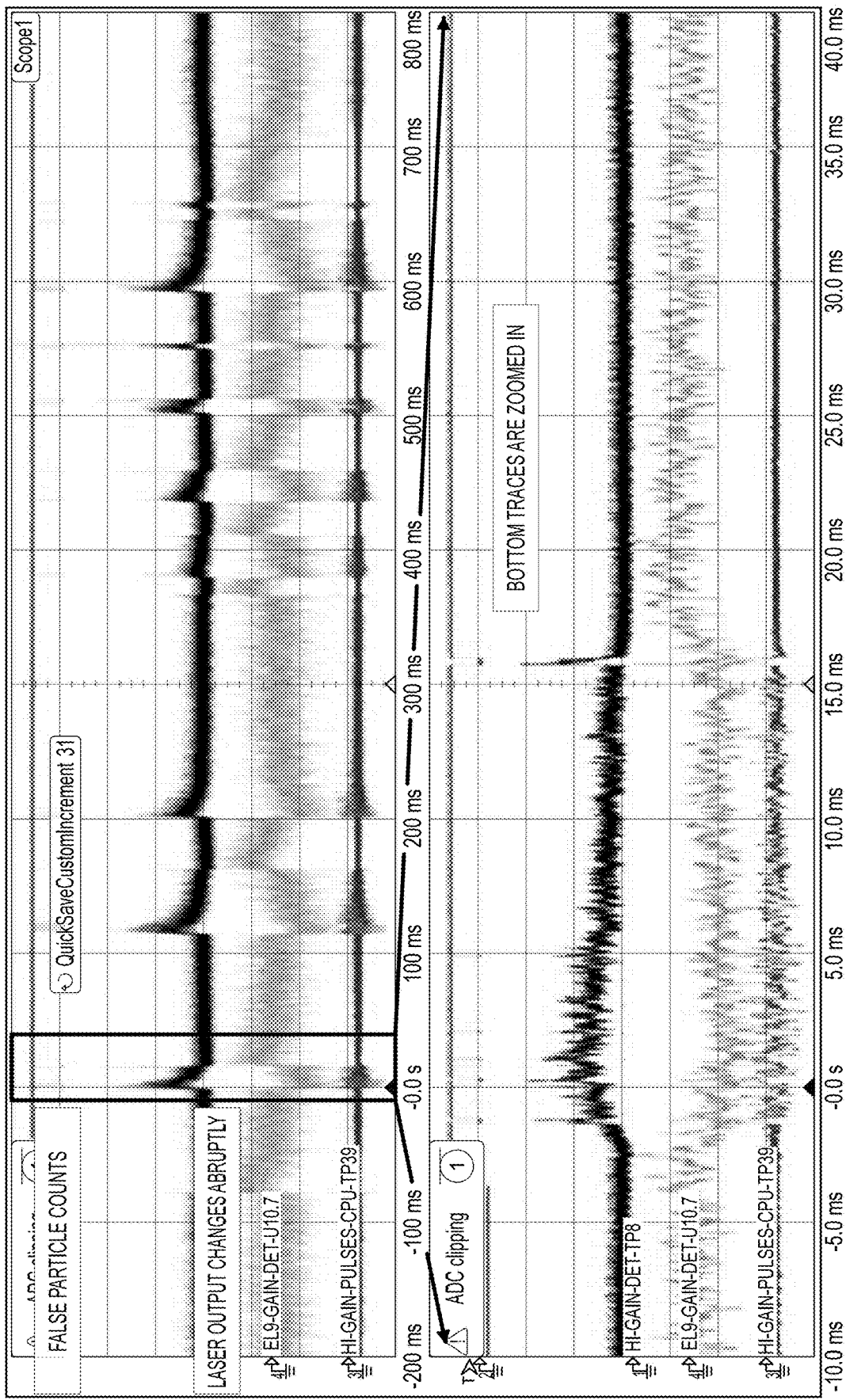
FIG. 5: Shows an oscilloscope screen capture depicting an abrupt change in laser light output causing a false-positive particle detection event.

Example 4—Methods for Identification of Noise Signatures in Raw Particle Count Data Turning now to FIG. 2, the following was performed.
1. Several buffers were created:
   a. Raw Data, including 20 nm particle counts from the unit, are read.
   b. Processed Data, which represents the output of the filtering algorithm.
   c. Rolling Averages of 100 and 50 100 ms intervals.
   d. Event Packets of duration 15, 10 and 5 100 ms intervals.
   e. Ratio Checks to compare 20 nm and 50 nm counts during the same time period.
   f. Baseline estimations based on previous 1 minute, 10 minutes, and 60 minutes of processed data.
   g. Process flag specifies the result of each test and final noise determination.
2. Data Pointers were defined:
   a. CD—Current Data Pointer, which points to the last 100 ms raw data sample stored in the Raw Data Buffer.
   b. PD—Processed Data Pointer, which points to the 100 ms interval data in the Processed Data Buffer that is sent on to the normal data processing chain.

The difference between CD and PD is the size of the Raw Data and Processed Data buffers and represent the time delay between when a raw 100 ms interval data is received and when its filtered version is sent on to the normal data processor.

As the filters determine if a raw 100 ms interval data is actual particle count data or a noise event, it posts the result into Process Data Flag Buffer. If the algorithm cannot determine if a Raw 100 ms interval is actual data or a noise event in the time allowed by the data buffering, it is assumed to be a noise event and discarded.

The method may comprise separate checks running in parallel for noise. If any of the checks determines a 100 ms count is noise, the 100 ms process data interval at PD is replaced by the baseline estimate. If all the checks fail the noise check (data is real particle counts), the 100 ms data interval at PD is replaced with the Raw Data count value.

Example 4A—Ratio Checking Method

A ratio checking method may be used to detect noise events that do not show up as a single continuous noise event. Instead, the noise event may be made up of many single or short duration low counts. This can happen, for example, if RMS noise is seen by the detector.

The assumption is the detector signal from the RMS noise only generates 20 nm particle counts. Real particles trigger particle counts in both the 20 nm and 50 nm channels and the ratio of 50 nm/20 nm counts is greater than some threshold. However, there must be sufficient 20 nm counts to perform the ratio check.

The method may check short intervals first. The 100 ms interval data from a short ratio buffer is then fed into the next longer ratio buffer and the process is repeated.

If the total 20 nm counts for 20 nm buffer exceeds a specified threshold (meaning there are sufficient 20 nm counts in the 20 nm ratio buffer that the corresponding 50 nm ratio buffer should have at least one count), then the 20 nm/50 nm ratio check is performed.

For example, 20 nm and 50 nm raw data may be streamed into single interval ratio check buffers. The output of these single interval ratio check buffers may then be fed into three 100 ms interval ratio buffers, which are then fed into five 100 ms interval ratio buffers and so on. At each 100 ms time interval, each 20 nm ratio buffer is checked to see if the total 20 nm counts exceed a minimum threshold. The threshold is the same for all buffers and is set to be equal to the number of 20 nm total counts which should correspond to at least one 50 nm count for any time period.

If the 20 nm total count threshold is exceeded, the number of counts in each of the 50 nm ratio buffers is divided by the number of counts in the corresponding 20 nm ratio buffer (ratio=50 nm counts/20 nm counts). For each buffer (1, 3, 5, 10, 100, and 600 100 ms intervals), if the ratio is greater than a 50/20 nm ratio threshold, then the data is assumed to be actual particle counts for that buffer and the data in the buffer is left unchanged.

For each buffer, if the ratio is less than the 50/20 ratio threshold, then the data is assumed to be caused by a noise event and all the data in the buffer is changed to the baseline value. Thus, noise events detected in shorter time frames are eliminated before being used to check longer time periods. When the data reaches the end of the last ratio buffer it is shifted into a holding buffer to be used as one of the criteria for determining a particle or noise for the interval.

Example 4A1—Exemplified Ratio Checking Method: Ratio Check Auto-Threshold Creation Algorithm with Automatic Calculation of Noise Event Detection Thresholds Inputs: Baseline estimates generated and used for replacing detected false particle counts. They are generated from processed 100 ms CH1 and CH2 (no false particle counts) counts.

Definitions: BL_600_CH1 is defined as CH1 counts/100 ms baseline based 1 Minute Rolling Average. BL_6000_CH1 is defined as CH1 counts/100 ms baseline based 10 Minute Rolling Average. BL_600_CH2 is defined as CH2 counts/100 ms baseline based 1 Minute Rolling Average. BL_6000_CH2 is defined as CH2 counts/100 ms baseline based 10 Minute Rolling Average. BL_600_CH3 is defined as CH3 counts/100 ms baseline based 1 Minute Rolling Average. BL_6000_CH3 is defined as CH3 counts/100 ms baseline based 10 Minute Rolling Average Assumptions: Because baselines are average counts per 100 ms, typically their values are a floating number less than 1. (Meaning on average there are generally less than one count per 100 ms received). The arrival rate of all particles is assumed to follow a Poisson distribution. Poisson distributions have a standard deviation equal to the square root of the mean arrival rate.

Because of the variability of arrival rates for each of the different particle sizes, which greatly impacts any ratio between channel calculations, ratio check is only performed on the 60 second interval. Using shorter intervals increases variance of the CH2/CH1 ratio and the likelihood the CH2/CH1 ratio of being less than the ratio check threshold resulting in real particle count data being eliminated.

Step 1—Calculate the Check Value for Each 60 Second Evaluation Interval.

The CH1_Check_Value CHECKVAL_60SEC(n) is used to indicate when the CH1 counts rise too quickly relative to the corresponding CH1 baseline values. CH1 baseline values represent the average CH1 counts per 100 ms interval over 1 and 10 minute periods. However, the baseline values can have high variability depending on the variability of the raw CH1 counts. To minimize the impact of this variability, a filtered version of the baseline values is used to calculate CH1_Check_Value.

The exemplified filter has two modes:
1. If the number of raw counts received in the last 60 seconds is higher than CH1_Check_Value
2. If the number of raw counts received in the last 60 seconds is equal to or lower than CH1_Check_Value A filter adjustment factor (FILT_ADJ_FACTOR) is used to control the rate CH1_Check_Value can change for each of these two modes.

First, calculate total number of raw CH1 counts for each evaluation in each 60 second interval: RAW_CNTS_CH1_60SEC(n)=Total Number of Raw Channel 1 Counts over the previous 60 seconds or 600 100 ms intervals.

Then compare raw counts to the previous check value: CHECKVAL_60SEC(n-1) to determine the filter adjustment factor:

IF RAW_CNTS_CH1_60SEC(n)>CHECKVAL_60SEC (n-1),
then FILT_ADJ_FACTOR=0.00001, else FILT_ADJ_FACTOR=0.001

This is to allow CHECKVAL_60SEC(n), to adjust to changing count statistics (if rising—using a smaller filter adjustment factor) and closely track the same statistics if they are static.

Next, calculate the average minimum baseline CH1 counts for each evaluation period based on the baseline averages:

$$AVE\_CNTS\_CH1\_60SEC(n) = 600 * \min(BL\_600\_CH1, BL\_6000\_CH1) + 1$$

The "600" is to convert from counts/100 ms to counts/minute. The +1 is to ensure a minimum count that is greater than 1. Using the minimum of the 1 minute baseline (BL_600_CH1) and the 10 minute baseline (BL_6000_CH1) helps to keep a closer estimate of the actual baseline when it is decreasing. Because AVE_CNTS_CH1_60SEC(n) is generated at a 100 ms interval, it has high variability. To reduce this variability, AVE_CNTS_CH1_60SEC(n) is processed using a low pass filter. The new baseline estimate (FILT_CH1_60SEC(n)) is equal to the current baseline estimate (FILT_CH1_60SEC (n-1)) plus a small step. The small step is equal to the difference between AVE_CNTS_CH1_60SEC(n) and the last value (FILT_CH1_60SEC(n-1)) times the filter adjustment factor (FILT_ADJ_FACTOR). This process eliminates all rapid changes of the baseline estimate.

Calculate:

$$\text{FILT\_CH1\_60SEC}(n) = \text{FILT\_CH1\_60SEC}(n-1) + [\text{AVE\_CNTS\_CH1\_60SEC}(n) - \text{FILT\_CH1\_60SEC}(n-1)] * \text{FILT\_ADJ\_FACTOR}$$

Next, calculate the CH1 value check threshold (CHECKVAL_60SEC(n)). The check value equals the minimum number of CH1 counts that can occur in a corresponding interval before a ratio check is performed. Because the particle arrival rate is assumed to follow a Poisson distribution, the standard deviation of the arrival rate is equal to the square root of the mean value (SQRT (FILT_CH1_60SEC(n))).

CHECKVAL_60SEC(n) is then set to be the mean plus three standard deviations:

$$\text{CHECKVAL\_60SEC}(n) = \text{FILT\_CH1\_60SEC}(n) + 3 * \text{SQRT}(\text{FILT\_CH1\_60SEC}(n))$$

Step 2—Calculate the Ratio Check Thresholds

Because of the random nature particles are present in a liquid, the ratio check algorithm assumes the ratio occurrence of CH2 counts to CH1 counts is relatively static. Also, because noise events are more likely to affect CH1 counts, a decrease in the ratio of CH2/CH1 counts is an indication of a false particle event. First ratios estimated CH2/CH1 ratios are calculated at 100 ms rate based on the baseline estimations:

CH2/CH1_600(n)=BL600_CH2(n)/BL600_CH1(n) (Average ratio over a rolling 1 minute period)

CH2/CH1_6000(n)=BL6000_CH2(n)/BL-6000_CH1(n) (Average ratio over a rolling 10 minute period)

Then a low pass filtered version of each ratio is calculated to remove any short variations:

$$\text{RATIO\_CH2/CH1\_600}(n) = \text{RATIO\_CH2/CH1\_600}(n-1) + [\text{CH2/CH1\_600}(n) - \text{RATIO\_CH2/CH1\_600}(n-1)] * 0.001$$

$$\text{RATIO\_CH2/CH1\_6000}(n) = \text{RATIO\_CH2/CH1\_6000}(n) + [\text{CH2/CH1\_6000}(n) - \text{RATIO\_CH2/CH1\_6000}(n-1)) * 0.001$$

The 0.001 factor slows the rate at which the ratios are allowed to change.

Finally, the CH2/CH1 and CH3/CH1 ratio check values are calculated:

$$\text{RATIOCHECK21}(n) = \text{MAX}(\text{RATIO\_CH2/CH1\_600}(n), \text{RATIO\_CH2/CH1\_6000}(n)) * 0.8$$

The 0.8 is to ensure the check ratio is less than the average normal ratio.

Ratio Check—

The following is only used if autogenerated CHECKVAL and RATIOCHECK values are used.

Test 1—For each 60 second evaluation interval check the total number of CH1 counts against the corresponding check value (i.e. whether CH1 counts appears to be too high from the historical average):

If total CH1(counts/60 Sec)>CHECKVAL_60SEC, then perform 60 second ratio check,
else do not perform ratio check for that interval and flag all 100 ms intervals in the evaluation interval as good data.

Test 2—Perform CH2/CH1 and CH3/CH1 ratio checks for each evaluation interval:

Calculate for each interval actual received CH2 and CH1 counts.

Because CHECKVAL_60SEC is guaranteed to be greater than 1, the ratio check is therefore only performed when CH1(Counts/60 Sec) is also greater than 1.

False particle counts are assumed if the number of CH1 counts increases without a corresponding increase in the CH2 counts, which causes the ration between CH2 & CH1 to reduce:

If CH2(counts/60 Sec)/CH1(counts/60 Sec)) is less than RATIOCHECK21(n), then then flag all the 100 ms intervals as false particles, else Calculate for each interval actual received CH3 and CH1 counts.

False particle counts are assumed if the number of CH1 counts increases without a corresponding increase in the CH3 counts, which causes the ration between CH3 & CH1 to reduce:

If CH3(counts/60 Sec)/CH1(counts/60 Sec)) is less than RATIOCHECK31(n), then then flag all the 100 ms intervals as false particles, else flag all 100 ms intervals as good counts.

Example 48—Event Checking

Event checking may used when the noise event causes long continuous durations of 100 ms interval high particle counts called evaluation periods. An evaluation period starts when the last raw 50 nm/20 nm ratio at CD is less than one and the next 100 ms 20 nm average at CD exceeds a threshold compared to the baseline. The evaluation period continues until a follow on Raw 100 ms interval count falls below the threshold.

During an evaluation period, a running total of 20 nm and 50 nm counts are made. If the evaluation period extends from PD to CD, then all the 100 ms elements in the Raw Data buffer are marked as being in evaluation.

At the end of an evaluation interval, if the total number of 20 nm 100 ms interval counts exceeds a threshold, then the total number of 50 nm 10 ms interval counts is divided by the total number of 20 nm 100 ms interval counts. If this number is greater than a 50/20 nm count ratio, then the data is assumed to be actual particle counts. If this number is less, then the data in the evaluation period is assumed to be caused by a noise event and the process flag for all the 100 ms intervals is set to identify them as noise.

Example 4C—Event Period Checking

Event period checking examines a set of 15 sequential 100 ms interval raw counts looking for a maxima of particle counts surrounded on both sides by minima, depicting a burst of particles that arrives and then disappears too quickly to reflect a physically plausible slug of particles flowing through the sample cell of the particle detection system.

Example 4D—First Embodiment of Event Comparison

Event comparison may be used to reduce false positive particle detection events as follows. Starting with a short interval, (a) the counts of the first channel and second channels may be independently summed. (b) If the number of counts in the first channel exceeds a threshold, where the probability of at least on particle count in the second channel is likely to occur, then the ratio check is performed. (c) If the ratio check fails, then all the time intervals of the ratio check are flagged as noise.

Steps (a)-(c) may then be repeated with increasing larger time intervals, except time intervals that were determined (flagged) to be noise are not used in the particle count sum for any subsequent larger time intervals. In one embodiment, steps (a)-(c) are repeated a total of five times for a total of five different time intervals. The five time intervals may correspond to chains of three, ten, one hundred, three hundred, and six hundred sequential 100 ms raw data collection intervals, respectively (i.e., 0.3, 1, 10, 30, and 60 seconds of continuous data, respectively)

Example 4E—Second Embodiment of Event Comparison

The method begins with a Noise/Evaluation transition prevention, wherein if either the raw 5 second or raw 10 second rolling average Chi/CH2 ratio is less than the Ratio Limit then then raw data is assumed to be real particles. Alternatively, the data may be marked as noise: when both the raw 5 second and raw 10 second rolling average is greater than the Noise limit then the data is identified as a Noise Event, or when an event packet of 15 100 ms raw data collection intervals shows a spike twice the Noise limit with empty elements, or evaluation period is about to exceed defined delay period, then Noise Event evaluation period is identified as a noise event.

Data may be further evaluated as follows: If both a raw first interval count and raw second interval count is greater than the Evaluation limit, the first interval being shorter than the second interval, then a Noise Evaluation is started. The Noise Evaluation may be completed as follows: if either raw first interval or raw second interval average CH1/CH2 ratio is less than the Ratio Limit, then the event is ended, or if either raw first interval count or raw second interval count is less than the Clear Event limit, then the event is ended.

Example 4F—Replacing Noise Event Data with Historical Average Data

In one aspect, at each 100 ms interval: if the result of any of the algorithms at PD are flagged as a noise event, the data is replaced by the baseline for that time period. Otherwise the raw data at PD is used for the processed data. The output of the processed data stream is used to generate an estimate of the baseline.

Three baseline calculations are created: a 1 minute rolling average of the processed data; a 10 minute rolling average of the processed data; and a 60 minute rolling average of the processed data, which excludes noise data. Baseline averages are rounded down to the nearest integer. If the 1 minute rolling average uses less than "x" number of raw values, then the lowest of the three rolling averages is used for the baseline.

FIGS. 1, 2, 3A, 3B, 3C, 4A, 4B and 4C illustrate flow charts of certain embodiments of methods of reducing false-positive particle detection events. Although these methods are described in the context of a computer-implemented method performed by one or more processors, the methods may also be performed by a program, custom circuitry, or by a combination of custom circuitry and a program. For example, the methods may be executed by a CPU (central processing unit), a GPU (graphics processing unit), or any processor, micro-controller, or application-specific integrated circuit (ASIC) capable of implementing, at least in part, the processes and steps described herein with respect to the various embodiments of the methods. For instance, the methods may be implemented by particle analysis device functioning as an embedded system. Furthermore, persons of ordinary skill in the art will understand that any system that performs the methods of FIGS. 1, 2, 3A, 3B, 3C, 4A, 4B and 4C are within the scope and spirit of embodiments of the present disclosure.

Example 5—Mitigation for Laser Operational Stability Issue (1)

Laser operational stability issue (1), identified above in Example 1, may result from the laser being controlled by its own independent closed loop control system. In one aspect, instead of relying on the laser's own control system to keep the laser output power between some limits (1640-1660 mW), the particle measuring system central controller may control the laser so that, for example, corrections to the laser power will be known and even predictable to the particle measuring system processor. By knowing when the laser power is being adjusted, the system can stop counting particles until the laser stabilizes after being changed.

In one embodiment, the particle detection system may power up the laser normally and allow the laser output to stabilize to some output power level in a first relatively narrow set point range. The particle measuring system controller may then change the limits from the start up set point to allow the laser output to drift in a larger set point range, to prevent the laser from trying to correct the power by adjusting the laser current.

In one embodiment, the particle measuring system controller monitors the laser power output. In this embodiment, the Operating Threshold=a set point +/−40 mW or larger and the Adjustment Threshold=a set point +/−0 to +/−20 mW. If the laser power output exceeds the operating threshold, then particle measuring system controller may stop counting particles.

The particle measuring system controller may then enforce the adjustment threshold and allow the laser to move the output power near the set point. The system would then allow the laser to stabilize.

Once the output power has moved to within the set point +/−(Adjustment Threshold) and stabilized, the system would then again open up the limits to the set point +/−(Operating Threshold) and allow the laser output power to drift uncontrolled. The particle measuring system controller would then resume counting particles.

Example 6—Mitigation for Laser Operational Stability Issue (2)

In one aspect, laser operational stability issue (2), identified above in Example 1, may be addressed via the following method. If the laser stalls at a temperature where it becomes unstable or exhibits behaviors that indicate it may become unstable (discussed below), the system would discard all particle counts for a short period of time prior to detecting characteristics of laser instability and stop counting particles for a period of time until the laser stabilizes while performing one or more of the following:

Wait for the laser to re-stabilize.

Readjust the laser power level back to near the set point +/−(Adjustment Threshold) discussed above. Changing the power level can also change the specific temperature at which the laser goes unstable.

Set the laser power level to a high level for a period of time to add heat to the laser just enough to change its temperature and allow it to re-stabilize.

Turn the laser power off for a period of time. This has the effect of allowing the laser to cool.

The symptoms of laser instability which may be employed as a laser instability signature include the following:

Abrupt larger than normal changes in output power. (plus or minus)

Abnormal increase in particle counts. (Which may be caused by an increase in RMS laser noise).

Abrupt larger than normal changes in laser current. (plus or minus)

This issue will generally not occur when mitigation for the First Laser Problem (discussed above) is active.

Example 7—Mitigation for Laser Operational Stability Issue (3)

In one aspect, laser operational stability issue (3), identified in Example 1 above, may be addressed as follows. By monitoring the occurrence of having to perform either of the two above laser problem mitigations, a predictive algorithm may estimate when the next laser instability is likely to occur. As a preventative or corrective action, the laser optimization routine may be run when: (1) It is determined the laser is trending towards, near, or at operating at an unstable condition. This tunes when the optimization occurs for each system. (2) On a preset schedule. (3) On user demand to allow the user to specify when this occurs so as to not disrupt normal particle monitoring operations.

FIGS. 5, 6A, 6B, 7, 8A, 8B and 9 show oscilloscope screen captures illustrating examples of various modes of laser instability each. The top (Green) trace shows the actual false particle counts. The yellow trace is an intermediate trace of an amplifier output (not important for this discussion). The red trace is an amplified and inverted output of the detector (Negative going signal represents an increase in the detector output; Positive going signal represents a decrease in detector output). The blue trace is the signal is compared against a threshold to generate the green particle counts. (When the blue trace in this example exceeds a predetermined threshold, a particle count is generated).

Example 8—First Evaluation of Performance of the Method

FIG. 10 shows a first example of the efficacy of the disclosed methods. The horizontal scale is time in 100 ms intervals×10 W. The time between time periods 1 and 2 on the horizontal axis is 1,000,000 100 ms intervals or 27.8 hours. The vertical scale is the number of reported counts during a 100 ms interval.

The line labeled "20 nm Counts" is raw unfiltered 20 nm data. The spikes in this data between time periods 2 to 5 are noise events. The increases in reported counts above the baseline between time period 5 and 6 is an actual process event where the user intentionally made a change to their process, which resulted in a rapid increase in count followed by a slow ramp down back to the baseline. The unfiltered 20 nm data and the filtered 20 nm data are indistinguishable in this time period between 5 and 6, demonstrating the efficacy of the method.

The line labeled "20 nm Filtered" is the output of the method for 20 nm data. As can be seen, between time periods 0 to 5, the method successfully identified all of the noise events and replaced them with an estimate of the baseline counts.

Between the time period of 5 to 6 the method successfully identified the increase in counts was not a noise event and accurately reported the actual data as it occurred.

Example 9—Second Evaluation of Performance of the Method

FIG. 11 shows a second example of the efficacy of the disclosed methods. The horizontal scale is time reported in 30 minute intervals on the days shown. The vertical scale is the number of reported counts during a reporting interval. The line labeled "Raw Data 20 nm" is raw unfiltered 20 nm data. The spikes in reported counts in the raw unfiltered 20 nm data between time periods December 24 and December 28 correspond to noise events in an optical particle counter.

The line labeled "Filtered Data" is the output of the noise filtering method for the 20 nm data. As can be seen, in the time periods December 24 and December 28, the method successfully identified the noise events and replaced them with estimates of the baseline counts. This shows that even under extreme noise events, the method is able to maintain close approximation to the actual particle count baseline.

Example 10—Third Evaluation of Performance of the Method

FIG. 12 shows a third example of the efficacy of the disclosed methods. Horizontal scale is time days. The line labeled "Raw Data 20 nm" is raw unfiltered 20 nm particle data. The spikes in the raw unfiltered 20 nm particle data in the time period around January 14 correspond to noise events in the optical particle counter unit.

The increase in reported counts above the baseline between time period just prior to January 20 is an actual process event where the user intentionally made a change to their process, which resulted in a rapid increase in count followed by a slow ramp down back to the baseline. The line labeled "20 nm Filtered Data" is the output of the noise filtering method for the 20 nm particle data.

As can be seen, the algorithm successfully identified all of the noise events and replaced them with an estimate of the baseline counts. The method successfully identified the increase in counts was not a noise event and accurately reported the actual data as it occurred.

The line labeled "Raw Data 50 nm" is raw unfiltered 50 nm particle data. No noise was detected on the 50 nm particle channel. Thus, data for the 50 nm particles was not changed.

Example 11—Noise Event Data

FIG. 13 shows an example of data resulting from one or more noise events. The horizontal scale is number of 100 ms intervals (36000 counts=1 hour of data). The total time displayed is approximately 22 days. The vertical scale is the number of particle counts reported in a one second interval. The line labeled "RAW 1-1" is channel 1 (20 nm particles) raw particle counts. The spikes in the raw 20 nm data are noise which cannot be attributed to any normal process change. The line labeled "RAW 2-1" corresponds to channel 2 (50 nm particles) particle counts. As can be seen, the raw 50 nm particle count data does not include any spikes that would correspond to the spikes in the raw 20 nm count data. Thus, the raw 20 nm particle count data and the raw 50 nm particle count data, when taken together, is indicative of noise occurring in the 20 nm channel of the instrument because there are no corresponding spikes in the 50 nm channel—a large spike in 20 nm particles would be expected to also be accompanied by a spike in 50 nm particles.

Aspects

Aspects and combinations of aspects of the present invention may include:

Aspect 1. A method for reducing false-positive particle detection events of an optical particle detector, the method comprising:
flowing a particle-containing fluid through a detection region;
exposing the fluid in the detection region to a beam of electromagnetic radiation, wherein interaction between particles of the particle-containing fluid and the beam of electromagnetic radiation generates scattered or emitted electromagnetic radiation from the particles;
directing at least a portion of the scattered or emitted electromagnetic radiation from the particles onto a photodetector;
generating raw particle count data via the photodetector, wherein the raw particle count data includes a plurality of channels, each channel being correlated to a different particle size bin;
filtering the raw particle count data to produce filtered particle count data, wherein the filtering comprises:
temporarily storing the raw particle count data for a buffering time period;
segmenting the raw particle count data into a series of elemental data intervals;
examining each elemental data interval for a noise signature;
identifying a noise signature in the segmented raw particle count data;
in response to the identified noise signature, flagging one or more sequential elemental data intervals as corresponding to a noise event; and
removing the one or more flagged elemental data intervals from the raw particle count data to produce the filtered particle count data, and/or generating replacement data and substituting the replacement data for the one or more flagged elemental data intervals to produce the filtered particle count data;
periodically reporting a particle measurement output to a user at a reporting interval, wherein the particle measurement output is based on the filtered particle count data; and
wherein the reporting interval has a greater time duration than that of the elemental data intervals.

Aspect 2. The method of aspect 1, wherein generating the replacement data comprises calculating historical average data to produce the replacement data.

Aspect 3. The method of aspect 1 or 2, wherein generating the replacement data comprises:
interpolating the raw particle count data from the beginning point of the noise event to the end point of the noise event to produce the replacement data.

Aspect 4. The method of any of aspects 1-3, wherein identifying the detector noise signature comprises:
receiving data from a first channel of the raw particle count data, the first channel being correlated to a first particle size bin;
receiving data from a second channel of the raw particle count data, the second channel being correlated to second particle size bin;
calculating, for a first elemental data interval, a first unfiltered particle count for particles of the first size bin;
calculating, for the first elemental data interval, a second unfiltered particle count for particles of the second size bin;
determining a ratio of the second unfiltered particle count to the first unfiltered particle count; and
if the ratio falls below a threshold value, then identifying the data of the first and second channel as having the detector noise signature.

Aspect 5. The method of aspect 4, comprising:
calculating, for a data interval comprising at least the first elemental data interval and a second elemental data interval, a third unfiltered particle count for particles of the third size bin;
determining a ratio of the third unfiltered particle count to the first unfiltered particle count; and
if the ratio falls below a ratio threshold value, then identifying the data of the first and second channel as having the detector noise signature.

Aspect 6. The method of aspect 4 or 5, wherein the second particle size bin corresponds to larger particles than those of the first particle size bin.

Aspect 7. The method of aspect 4 or 5, wherein the first particle size bin corresponds to smaller particles than those of all the other particle size bins.

Aspect 8. The method of aspect 4 or 5, wherein the first size bin corresponds to particles having a size range from 1 to 50 nm.

Aspect 9. The method of aspect 4 or 5, wherein the second size bin corresponds to particles having a size range from 1 to 100 nm.

Aspect 10. The method of aspect 4 or 5, wherein the third size bin corresponds to particles having a size range from 1 to 100 nm.

Aspect 11. The method of any of aspects 1-10, wherein examining each elemental data interval comprises:
when a raw particle count of a first elemental data interval falls below a first particle count threshold value, and a raw particle count of the next sequential elemental data interval in the series exceeds the first particle count threshold value, beginning a data evaluation period;
continuing the data evaluation period for so long as each consecutive raw particle count of the series of sequential of elemental data intervals exceeds the respective particle count threshold value; and
when a raw particle count of the series falls below the first particle count threshold value, ending the data evaluation period;
summing the raw particle counts from the first channel over the data evaluation period;
summing the raw particle counts from the second channel over the data evaluation period;
if the sum of the first channel raw particle counts exceeds a summed particle count threshold value, then calculating a ratio of the sum of the second channel raw particle counts to the sum of the first channel raw particle counts;

if the ratio falls below a noise ratio threshold value, then identifying all the particle counts of the data evaluation period as having the detector noise signature.

Aspect 12. The method of aspect 11, wherein the second particle size bin corresponds to larger particles than those of the first particle size bin.

Aspect 13. The method of aspect 11 or 12, wherein the first particle size bin corresponds to smaller particles than those of all the other particle size bins.

Aspect 14. The method of any of aspects 1-13, wherein a first channel is correlated to a first particle size bin and a second channel is correlated to a second particle size bin;
 summing the raw particle counts from the first channel for a first predetermined number of sequential elemental data intervals;
 summing the raw particle counts from the second channel for the first predetermined number of sequential elemental data intervals;
 calculating a first ratio of the sum of the second channel raw particle counts for the first predetermined number of sequential elemental data intervals to the sum of the first channel raw particle counts for the first predetermined number of sequential elemental data intervals;
 wherein if the first ratio falls below a noise ratio threshold value, then identifying all the particle counts of the first predetermined number of sequential elemental data intervals as having the detector noise signature.

Aspect 15. The method of aspect 14, wherein the second particle size bin corresponds to larger particles than those of the first particle size bin.

Aspect 16. The method of aspect 14, wherein the first particle size bin corresponds to smaller particles than those of all the other particle size bins.

Aspect 17. The method of any of aspects 1-16 wherein identifying the detector noise signature comprises:
 for a first time interval comprising one or more elemental data intervals:
  (a) comparing a raw particle count of a first channel of the plurality of channels to a predetermined first channel threshold value, wherein the first channel threshold value is such that at or above the first channel threshold value, at least one particle would be statistically likely to have been detected in a second channel of the plurality of channels, the second channel corresponding to particles of a larger size bin than the first channel;
  (b) if the raw particle count of the first channel exceeds the first channel threshold value, then calculating a ratio of the raw particle count of the first channel to a raw particle count of the second channel and comparing the calculated ratio to a ratio threshold value;
  (c) if the calculated ratio exceeds the ratio threshold value, then identifying the data of the first time interval as having the detector noise signature and removing it from the raw particle count data of the first interval to produce filtered first interval data; and
 repeating steps (a)-(c) for a second time interval, wherein the second time interval is longer in duration than the first time interval and subsumes the first interval, and wherein the data of the second time interval includes the filtered first interval data.

Aspect 18. The method of aspect 17, comprising repeating steps (a)-(c) for at least a third time interval, wherein the third time interval is longer in duration than the second time interval and subsumes the first and second intervals, and wherein the data of the third time interval includes the filtered first interval data and any filtered second interval data.

Aspect 19. The method of aspect 18, comprising repeating steps (a)-(c) for a total of at least 4 times.

Aspect 20. The method of aspect 17, wherein the second particle size bin corresponds to larger particles than those of the first particle size bin.

Aspect 21. The method of aspect 17, wherein the first particle size bin corresponds to smaller particles than those of all the other particle size bins.

Aspect 22. The method of any of aspects 1-21, comprising:
 producing the beam of electromagnetic radiation via a laser;
 monitoring an operating parameter of the laser; produce electrical current rate of change data;
 comparing the laser operating parameter to a laser threshold value; and
 if the operating parameter exceeds the laser threshold value, then identifying any raw particle count data associated with the rate of change as having the detector noise signature.

Aspect 23. The method of any of aspects 1-22, comprising:
 producing the beam of electromagnetic radiation via a laser;
 monitoring an electrical current of the laser over a time interval selected from the range of 10 microseconds to 1 second to produce electrical current rate of change data;
 associating the raw particle count data with the electrical current rate of change data;
 comparing the electrical current rate of change data to a current rate of change threshold value; and
 if a rate of change of the electrical current exceeds the current rate of change threshold value, then identifying any raw particle count data associated with the excessive electrical current rate of change as having the detector noise signature.

Aspect 24. The method of any of aspects 1-23, comprising:
 producing the beam of electromagnetic radiation via a laser;
 monitoring an electrical power of the laser over a time interval selected from the range of 10 microseconds to 1 second to produce electrical power rate of change data;
 associating the raw particle count data with the electrical power rate of change data;
 comparing the electrical power rate of change data to a power rate of change threshold value; and
 if a rate of change of the electrical power exceeds the power rate of change threshold value, then identifying any raw particle count data associated with the excessive electrical rate of change as having the detector noise signature.

Aspect 25. The method of any of aspects 1-24, wherein identifying the detector noise signature comprises:
 monitoring the raw particle count data for a rate of change of particle;
 comparing the rate of change of particle counts to a particle count threshold value; and if a rate of change of the electrical power exceeds the particle count threshold value, then identifying any raw particle count data associated with the rate of change as having the detector noise signature.

Aspect 26. The method of any of aspects 1-25, wherein identifying the detector noise signature comprises:
monitoring the raw particle count data for an amplitude of change of particle counts;
comparing the amplitude of particle counts to an amplitude threshold value; and
if the amplitude exceeds the amplitude threshold value, then identifying any raw particle count data associated with the excess amplitude as having the detector noise signature.

Aspect 27. The method of any of aspects 1-26, wherein the historical average data is produced via:
calculating a first rolling average of particle counts of the filtered particle count data over a first time interval; and
calculating a second rolling average of particle counts of the filtered particle count data over a second time interval;
wherein the first time interval is shorter than the second time interval; and
if the first rolling average is greater than or equal to a particle count threshold, utilizing the first rolling average as the historical average data; and
if the first rolling average is less than the particle count threshold number of particles counted, utilizing the second rolling average as the historical average data.

Aspect 28. The method of any of aspects 1-27, wherein the photodetector is a first photodetector, the method comprising:
prior to exposing the fluid in the detection zone to the beam of electromagnetic radiation, directing a portion of the beam to a second photodetector;
generating beam stability data via the second photodetector;
monitoring the beam stability data to identify periods of beam instability;
in response to an identification of a period of beam instability, initiating a pause in collection of raw particle count data, the pause corresponding to the duration of the beam instability;
resuming the collection of raw particle count data.

Aspect 29. The method of aspect 28, wherein the beam stability data includes beam power stability data, and wherein monitoring the beam stability data comprises:
comparing the beam power stability data to a predetermined power stability threshold value, wherein if the power stability threshold is exceeded, identifying the period associated with the excess beam power as the period of beam instability.

Aspect 30. The method of aspect 28, wherein the second photodetector comprises a plurality of detector elements arranged to detect changes in the beam propagation axis, wherein the beam stability data includes beam movement data, and wherein monitoring the beam stability data comprises:
comparing the beam movement data to a predetermined movement threshold, wherein if the movement threshold is exceeded, identifying the period associated with the excess beam movement as the period of beam instability.

Aspect 31. The method of any of aspects 1-30, comprising:
producing the beam of electromagnetic radiation via a laser,
controlling a parameter of the laser via closed loop control, wherein the controlling comprises:
monitoring the laser parameter;
comparing the laser output to at least one set point; and
if the comparison of the laser output to the at least one set point indicates that an adjustment is needed, then:
generating a pause collection signal; and
adjusting the laser output.

Aspect 32. The method of aspect 31, comprising resuming storing the stream of raw particle count data after a predetermined time has elapsed.

Aspect 33. The method of aspect 31 or 32, comprising resuming storing the stream of raw particle count data in response to a determination that the laser is operating at a stable temperature.

Aspect 34. The method of any of aspect 31-33, wherein the laser parameter is laser output power.

Aspect 35. The method of any of aspects 31-34, comprising:
in response to the pause collection signal, deleting a raw particle count data interval, the data interval corresponding to a time interval immediately prior to the point in time the pause collection signal was generated.

Aspect 36. The method of any of aspects 1-35, comprising:
producing the beam of electromagnetic radiation via a laser;
monitoring for periods of laser instability, wherein the monitoring comprises:
analyzing a parameter of the laser for a laser instability signature;
wherein, if the laser instability signature and/or the noise signature are identified, initiating a temporary pause in the storing of the raw particle count data and initiating a laser temperature perturbation.

Aspect 37. The method of aspect 36, comprising resuming storing the stream of raw particle count data after the laser temperature perturbation is complete.

Aspect 38. The method of aspect 36 or 37, wherein the laser parameter is laser output power.

Aspect 39. The method of any of aspects 36-38, wherein the initiating the laser temperature perturbation comprises:
adjusting the laser output power;
changing one or more laser output power set points of the closed loop control; and/or
temporarily turning the laser off.

Aspect 40. The method of any of aspects 36-39, comprising:
in response to the initiation of the pause in the storing of the raw particle count data, deleting a raw particle count data interval from the stored stream of raw particle count data, the data interval corresponding to a time interval immediately prior to the initiation of the pausing of the storing of the raw particle count data.

Aspect 41. The method of any of aspects 1-40, comprising:
producing the beam of electromagnetic radiation via a laser;

controlling an output of the laser via closed loop control;
predicting a period of laser instability;
in response to the predicted period of laser instability, initiating a temporary pause in the storing of the raw particle count data and initiating a laser optimization routine.

Aspect 42. The method of aspect 41, comprising resuming storing the stream of raw particle count data after a predetermined time has elapsed.

Aspect 43. The method of aspect 41 or 42, comprising resuming storing the stream of raw particle count data after receiving a signal that the laser optimization routine is complete.

Aspect 44. The method of any of aspects 41-43, comprising:
in response to initiating the temporary pause, deleting a raw particle count data interval, the data interval corresponding to a time interval immediately prior to the initiation of the pause in the storing of the raw particle count data.

Aspect 45. The method of any of aspects 41-44, wherein predicting the period of laser instability comprises:
analyzing an operating parameter of the laser for a laser instability precursor signature.

Aspect 46. The method of any of aspects 41-45, wherein predicting the period of laser instability comprises:
analyzing laser stability historical data and a calculating an average time between periods of laser instability;
predicting the period of laser instability based on the average time.

Aspect 47. The method of any of aspects 41-46, wherein the laser comprises a laser diode and an optical component configured for second-harmonic generation, the laser diode and/or the optical component being controlled by at least one closed loop temperature control system, and wherein the laser optimization routine comprises:
determining an optimal operating temperature for the laser diode and/or the optical component configured for second-harmonic generation; and
adjusting at least one temperature set point of the at least one closed loop control system.

Aspect 48. The method of any of aspects 41-47, wherein the laser comprises a laser diode and an optical component configured for second-harmonic generation, the laser diode being controlled by a first closed loop temperature control system and the optical component being controlled by a second closed loop temperature control system, and wherein the laser optimization routine comprises:
determining an optimal operating temperature for the laser diode;
adjusting a temperature set point of the first closed loop control system;
determining an optimal operating temperature for the optical component;
adjusting a temperature set point of the second closed loop control system.

Aspect 49. The method of any of aspects 1-48, wherein the time duration of each elemental data interval is selected from the range of 10 ms to 10 seconds.

Aspect 50. The method of any of aspects 1-49, wherein the time duration of each one of the elemental data intervals is less than or equal to 1 s.

Aspect 51. The method of any of aspects 1-50, wherein the time duration of each one of the elemental data intervals is less than or equal to 0.5 s.

Aspect 52. The method of any of aspects 1-51, wherein the time duration of each one of the elemental data intervals is less than or equal to 100 ms.

Aspect 53. The method of any of aspects 1-52, wherein the reporting interval has a time duration that is greater than or equal to 100 ms.

Aspect 54. The method of any of aspects 1-53, wherein the reporting interval has a time duration that greater than or equal to 0.5 s.

Aspect 55. The method of any of aspects 1-54, wherein the reporting interval has a time duration that greater than 1 s.

Aspect 56. The method of any of aspects 1-55, wherein the reporting interval has a time duration that is at least two times greater than that of each elemental data interval.

Aspect 57. The method of any of aspects 1-56, wherein the reporting interval has a time duration that is at least 10 times greater than that of each elemental data interval.

Aspect 58. The method of any of aspects 1-57, wherein the reporting interval has a time duration that is at least 100 times greater than that of each elemental data interval.

Aspect 59. The method of any of aspects 1-58, comprising reporting the identification of the noise event and the subsequent substitution of the replacement data for the one or more flagged elemental data intervals to the user Aspect 60. The method of any of aspects 1-59 comprising:
monitoring the filtered particle count data; and
triggering an alarm when the filtered particle count data indicates a particle count above a filtered particle count threshold value.

Aspect 61. A method for reducing false-positive particle detection events of an optical particle detector, the method comprising:
flowing a particle-containing fluid through a detection region;
producing a beam of electromagnetic radiation via a laser;
exposing the fluid in the detection region to the beam of electromagnetic radiation, wherein interaction between particles of the particle-containing fluid and the beam of electromagnetic radiation generates scattered or emitted electromagnetic radiation from the particles;
directing at least a portion of the scattered or emitted electromagnetic radiation from the particles onto a photodetector;
generating a stream of raw particle count data via the photodetector, wherein the raw particle count data includes a plurality of channels;
temporarily storing the stream of raw particle count data;
periodically reporting a particle measurement output to a user at a reporting interval, wherein the particle measurement output is based on the stored particle count data; and
monitoring an operating parameter of the laser,
comparing the laser operating parameter to a parameter threshold value; and
if a rate of change of the electrical current exceeds the parameter threshold value, flagging any raw particle count data associated with the rate of change as corresponding to a noise event and removing the flagged data from the stored raw particle count data before it is reported to the user.

Aspect 62. The method of aspect 61, comprising:
producing the beam of electromagnetic radiation via a laser;
monitoring an electrical current of the laser over a time interval selected from the range of 10 microseconds to 1 second to produce electrical current rate of change data;
associating the raw particle count data with the electrical current rate of change data;
comparing the electrical current rate of change data to a current rate of change threshold value; and
if a rate of change of the electrical current exceeds the current rate of change threshold value, then identifying any raw particle count data associated with the excessive electrical current rate of change as having the detector noise signature.

Aspect 63. The method of aspect 61, comprising:
producing the beam of electromagnetic radiation via a laser;
monitoring an electrical power of the laser over a time interval selected from the range of 10 microseconds to 1 second to produce electrical power rate of change data;
associating the raw particle count data with the electrical power rate of change data;
comparing the electrical power rate of change data to a power rate of change threshold value; and
if a rate of change of the electrical power exceeds the power rate of change threshold value, then identifying any raw particle count data associated with the excessive electrical rate of change as having the detector noise signature.

Aspect 64. A method for reducing false-positive particle detection events of an optical particle detector, the method comprising:
flowing a particle-containing fluid through a detection region;
producing a beam of electromagnetic radiation via a laser;
exposing the fluid in the detection region to the beam of electromagnetic radiation, wherein interaction between particles of the particle-containing fluid and the beam of electromagnetic radiation generates scattered or emitted electromagnetic radiation from the particles;
directing at least a portion of the scattered or emitted electromagnetic radiation from the particles onto a photodetector;
generating a stream of raw particle count data via the photodetector, wherein the raw particle count data includes a plurality of channels;
temporarily storing the stream of raw particle count data;
periodically reporting a particle measurement output to a user at a reporting interval, wherein the particle measurement output is based on the stored particle count data;
prior to exposing the fluid in the detection zone to the beam of electromagnetic radiation, directing a portion of the beam to a second photodetector;
generating beam stability data via the second photodetector;
monitoring the beam stability data to identify periods of beam instability;
in response to an identification of a period of beam instability, initiating a pause in collection of raw particle count data, the pause corresponding to the duration of the beam instability;
resuming the collection of raw particle count data.

Aspect 65. The method of aspect 64, wherein the beam stability data includes beam power stability data, and wherein monitoring the beam stability data comprises:
comparing the beam power stability data to a predetermined stability threshold value, wherein if the stability threshold is exceeded, identifying the period associated with the excess beam power as the period of beam instability.

Aspect 66. The method of aspect 64 or 65, wherein the second photodetector comprises a plurality of detector elements arranged to detect changes in the beam propagation axis, wherein the beam stability data includes beam movement data, and wherein monitoring the beam stability data comprises:
comparing the beam movement data to a predetermined movement threshold value, wherein if the movement threshold is exceeded, identifying the period associated with the excess beam movement as the period of beam instability.

Aspect 67. A method for reducing false-positive particle detection events of an optical particle detector, the method comprising:
flowing a particle-containing fluid through a detection region;
producing a beam of electromagnetic radiation via a laser;
controlling a parameter of the laser via closed loop control, wherein the controlling comprises:
monitoring the laser parameter;
comparing the laser output to at least one set point; and
if the comparison of the laser output to the at least one set point indicates that an adjustment is needed, then:
generating a pause collection signal; and
adjusting the laser output;
exposing the fluid in the detection region to the beam of electromagnetic radiation, wherein interaction between particles of the particle-containing fluid and the beam of electromagnetic radiation generates scattered or emitted electromagnetic radiation from the particles;
directing at least a portion of the scattered or emitted electromagnetic radiation from the particles onto a photodetector;
generating a stream of raw particle count data via the photodetector;
storing the stream of raw particle count data;
initiating a pause in storing the stream of raw particle count data in response to the pause collection signal; and
periodically reporting a particle measurement output to a user at a reporting interval, wherein the particle measurement output is based on the stored raw particle count data.

Aspect 68. The method of aspect 67, comprising resuming storing the stream of raw particle count data after a predetermined time has elapsed.

Aspect 69. The method of aspect 67 or 68, comprising resuming storing the stream of raw particle count data in response to a determination that the laser is operating at a stable temperature.

Aspect 70. The method of any of aspects 67-69, wherein the laser parameter is laser output power.

Aspect 71. The method of any of aspects 67-70, comprising:
in response to the pause collection signal, deleting a raw particle count data interval, the data interval corresponding to a time interval immediately prior to the point in time the pause collection signal was generated.

Aspect 72. A method for reducing false-positive particle detection events of an optical particle detector, the method comprising:
flowing a particle-containing fluid through a detection region;
producing a beam of electromagnetic radiation via a laser,
controlling an output of the laser via closed loop control;
exposing the fluid in the detection region to the beam of electromagnetic radiation, wherein interaction between particles of the particle-containing fluid and the beam of electromagnetic radiation generates scattered or emitted electromagnetic radiation from the particles;
directing at least a portion of the scattered or emitted electromagnetic radiation from the particles onto a photodetector;
generating a stream of raw particle count data via the photodetector;
storing the stream of raw particle count data;
monitoring for periods of laser instability, wherein the monitoring comprises:
analyzing a parameter of the laser for a laser instability signature; and/or
analyzing the raw particle count data for a noise signature;
wherein, if the laser instability signature and/or the noise signature are identified, initiating a temporary pause in the storing of the raw particle count data and initiating a laser temperature perturbation; and periodically reporting a particle measurement output to a user at a reporting interval, wherein the particle measurement output is based on the stored raw particle count data.

Aspect 73. The method of aspect 72, comprising resuming storing the stream of raw particle count data after the laser temperature perturbation is complete.

Aspect 74. The method of aspect 72 or 73, wherein the laser parameter is laser output power.

Aspect 75. The method of any of aspects 72-74, wherein the initiating the laser temperature perturbation comprises:
adjusting the laser output power;
changing one or more laser output power set points of the closed loop control; and/or
temporarily turning the laser off.

Aspect 76. The method of any of aspects 72-75, comprising:
in response to the initiation of the pause in the storing of the raw particle count data, deleting a raw particle count data interval from the stored stream of raw particle count data, the data interval corresponding to a time interval immediately prior to the initiation of the pausing of the storing of the raw particle count data.

Aspect 77. A method for reducing false-positive particle detection events of an optical particle detector, the method comprising:
flowing a particle-containing fluid through a detection region;
producing a beam of electromagnetic radiation via a laser;
controlling an output of the laser via closed loop control;
exposing the fluid in the detection region to the beam of electromagnetic radiation, wherein interaction between particles of the particle-containing fluid and the beam of electromagnetic radiation generates scattered or emitted electromagnetic radiation from the particles;
directing at least a portion of the scattered or emitted electromagnetic radiation from the particles onto a photodetector;
generating a stream of raw particle count data via the photodetector;
storing the stream of raw particle count data;
predicting a period of laser instability;
in response to the predicted period of laser instability, initiating a temporary pause in the storing of the raw particle count data and initiating a laser optimization routine; and
periodically reporting a particle measurement output to a user at a reporting interval, wherein the particle measurement output is based on the stored raw particle count data.

Aspect 78. The method of aspect 77, comprising resuming storing the stream of raw particle count data after a predetermined time has elapsed.

Aspect 79. The method of aspect 77 or 78, comprising resuming storing the stream of raw particle count data after receiving a signal that the laser optimization routine is complete.

Aspect 80. The method of any of aspects 77-79, comprising: in response to initiating the temporary pause, deleting a raw particle count data interval, the data interval corresponding to a time interval immediately prior to the initiation of the pause in the storing of the raw particle count data.

Aspect 81. The method of any of aspects 77-80, wherein predicting the period of laser instability comprises:
analyzing an operating parameter of the laser for a laser instability precursor signature.

Aspect 82. The method of any of aspects 77-81, wherein predicting the period of laser instability comprises:
analyzing laser stability historical data and a calculating an average time between periods of laser instability;
predicting the period of laser instability based on the average time.

Aspect 83. The method of any of aspects 77-82, wherein the laser comprises a laser diode and an optical component configured for second-harmonic generation, the laser diode and/or the optical component being controlled by at least one closed loop temperature control system, and wherein the laser optimization routine comprises:
determining an optimal operating temperature for the laser diode and/or the optical component configured for second-harmonic generation; and
adjusting at least one temperature set point of the at least one closed loop control system.

Aspect 84. The method of any of aspects 77-83, wherein the laser comprises a laser diode and an optical component configured for second-harmonic generation, the laser diode being controlled by a first closed loop temperature control system and the optical component being controlled by a second closed loop temperature control system, and wherein the laser optimization routine comprises:
- determining an optimal operating temperature for the laser diode;
- adjusting a temperature set point of the first closed loop control system;
- determining an optimal operating temperature for the optical component;
- adjusting a temperature set point of the second closed loop control system.

Aspect 85. A system for reducing false-positive particle detection events of an optical particle detector, the system comprising:
- a detection zone for flowing a particle-containing fluid therethrough;
- a beam of electromagnetic radiation transiting the fluid in the detection zone, wherein interaction between particles of the particle-containing fluid and the beam of electromagnetic radiation generates scattered or emitted electromagnetic radiation from the particles;
- a photodetector configured to:
  - receive at least a portion of the scattered or emitted electromagnetic radiation; and
  - generate raw particle count data, wherein the raw particle count data includes a plurality of channels, each channel being correlated to a different particle size bin;
- a processor configured to:
  - filter the raw particle count data to produce filtered particle count data, wherein the filtering comprises:
    - buffer the raw particle count data for a buffering time period;
    - segment the raw particle count data into a series of elemental data intervals;
    - examine each elemental data interval for a noise signature;
  - identifying a noise signature in the segmented raw particle count data;
    - in response to the identified noise signature, flag one or more sequential elemental data intervals as corresponding to a noise event;
    - remove the one or more flagged elemental data intervals from the raw particle count data to produce the filtered particle count data, and/or generate replacement data and substitute the replacement data for the one or more flagged elemental data intervals to produce the filtered particle count data;
    - periodically report a particle measurement output to a user at a reporting interval, wherein the particle measurement output is based on the filtered particle count data; and
    - wherein the reporting interval has a greater time duration than that of the elemental data intervals.

Aspect 86. A system for reducing false-positive particle detection events of an optical particle detector, the system comprising:
- a detection zone for flowing a particle-containing fluid therethrough;
- a beam of electromagnetic radiation transiting the fluid in the detection zone, wherein interaction between particles of the particle-containing fluid and the beam of electromagnetic radiation generates scattered or emitted electromagnetic radiation from the particles;
- a photodetector configured to:
  - receive at least a portion of the scattered or emitted electromagnetic radiation; and
  - generate raw particle count data, wherein the raw particle count data includes a plurality of channels, each channel being correlated to a different particle size bin;
- a processor configured to:
  - filter the raw particle count data to produce filtered particle count data, wherein the filtering comprises:
    - buffer the raw particle count data for a buffering time period;
    - segment the raw particle count data into a series of elemental data intervals;
    - examine each elemental data interval for a noise signature;
  - identifying a noise signature in the segmented raw particle count data;
    - in response to the identified noise signature, flag one or more sequential elemental data intervals as corresponding to a noise event;
    - remove the one or more flagged elemental data intervals from the raw particle count data to produce the filtered particle count data, and/or generate replacement data and substitute the replacement data for the one or more flagged elemental data intervals to produce the filtered particle count data;
    - periodically report a particle measurement output to a user at a reporting interval, wherein the particle measurement output is based on the filtered particle count data; and
  - wherein the reporting interval has a time duration greater than that of each elemental data interval.

Aspect 87. A system for reducing false-positive particle detection events of an optical particle detector, the system comprising:
- a detection zone for flowing a particle-containing fluid therethrough;
- a laser for producing a beam of electromagnetic radiation transiting the fluid in the detection zone, wherein interaction between particles of the particle-containing fluid and the beam of electromagnetic radiation generates scattered or emitted electromagnetic radiation from the particles;
- a photodetector configured to:
  - receive at least a portion of the scattered or emitted electromagnetic radiation; and
  - generate raw particle count data;
- a processor configured to:
  - monitor an operating parameter of the laser;
  - compare the laser operating parameter to a parameter threshold value; and
  - wherein if the laser operating parameter exceeds the parameter threshold value, flag any raw particle count data associated with the excess as a noise event and removing the flagged data from the stored raw particle count data before it is reported to the user.

Aspect 88. A system for reducing false-positive particle detection events of an optical particle detector, the system comprising:
- a detection zone for flowing a particle-containing fluid therethrough;
- a laser for producing a beam of electromagnetic radiation transiting the fluid in the detection zone, wherein interaction between particles of the particle-containing fluid and the beam of electromagnetic radiation generates scattered or emitted electromagnetic radiation from the particles;
- a first photodetector configured to:
  - receive at least a portion of the scattered or emitted electromagnetic radiation; and
  - generate raw particle count data;
- a second photodetector configured to sample a portion of the beam before it has entered the particle detection zone; and
- a processor configured to:
  - generate beam stability data via the second photodetector;
  - monitor the beam stability data to identify periods of beam instability;
  - in response to an identification of a period of beam instability, initiate a pause in collection of raw particle count data, the pause corresponding to the duration of the beam instability; and
  - resume the collection of raw particle count data.

STATEMENTS REGARDING INCORPORATION BY REFERENCE AND VARIATIONS

The following references, each of which is incorporated herein in its entirety to the extent not inconsistent herewith, relate to particle sampling, analysis, automation and robotic control: U.S. Pat. No. 11,237,095, issued Feb. 1, 2022; US Publication No. 2021/0208054, published Jul. 8, 2021; U.S. Pat. No. 10,921,229, issued Feb. 16, 2021; US Publication No. 2021/0381948, published Dec. 9, 2021; US Publication No. 2023/0236107, published Jul. 27, 2023; U.S. Pat. No. 8,154,724, issued Apr. 10, 2012; and U.S. Pat. No. 7,916,293, issued Mar. 29, 2011.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Every device, system, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method for reducing false-positive particle detection events of an optical particle detector, the method comprising:
    flowing a particle-containing fluid through a detection region;
    exposing the fluid in the detection region to a beam of electromagnetic radiation, wherein interaction between particles of the particle-containing fluid and the beam of electromagnetic radiation generates scattered or emitted electromagnetic radiation from the particles;
    directing at least a portion of the scattered or emitted electromagnetic radiation from the particles onto a photodetector;
    generating raw particle count data via the photodetector, wherein the raw particle count data includes a plurality of channels, each channel being correlated to a different particle size bin;
    filtering the raw particle count data to produce filtered particle count data, wherein the filtering comprises:
        temporarily storing the raw particle count data for a buffering time period;
        segmenting the raw particle count data into a series of elemental data intervals;
        examining each elemental data interval for a noise signature;
        identifying a noise signature in the segmented raw particle count data;
        in response to the identified noise signature, flagging one or more sequential elemental data intervals as corresponding to a noise event; and
        removing the one or more flagged elemental data intervals from the raw particle count data to produce the filtered particle count data, and/or generating replacement data and substituting the replacement data for the one or more flagged elemental data intervals to produce the filtered particle count data;
    periodically reporting a particle measurement output to a user at a reporting interval, wherein the particle measurement output is based on the filtered particle count data; and
    wherein the reporting interval has a greater time duration than that of the elemental data intervals.

2. The method of claim 1, wherein generating the replacement data comprises calculating historical average data to produce the replacement data or interpolating the raw particle count data from a beginning point of the noise event to an end point of the noise event to produce the replacement data.

3. The method of claim 1, wherein identifying the detector noise signature comprises:
    receiving data from a first channel of the raw particle count data, the first channel being correlated to a first particle size bin;
    receiving data from a second channel of the raw particle count data, the second channel being correlated to a second particle size bin;
    calculating, for a first elemental data interval, a first unfiltered particle count for particles of the first size bin;
    calculating, for the first elemental data interval, a second unfiltered particle count for particles of the second size bin;
    determining a ratio of the second unfiltered particle count to the first unfiltered particle count; and
    if the ratio falls below a threshold value, then identifying the data of the first and second channel as having the detector noise signature.

4. The method of claim 3, comprising:
    calculating, for a data interval comprising at least the first elemental data interval and a second elemental data interval, a third unfiltered particle count for particles of a third size bin;
    determining a ratio of the third unfiltered particle count to the first unfiltered particle count; and
    if the ratio falls below a ratio threshold value, then identifying the data of the first and second channel as having the detector noise signature.

5. The method of claim 1, wherein examining each elemental data interval comprises:
    when a raw particle count of a first elemental data interval falls below a first particle count threshold value, and a raw particle count of the next sequential elemental data interval in the series exceeds the first particle count threshold value, beginning a data evaluation period;
    continuing the data evaluation period for so long as each consecutive raw particle count of the series of sequential elemental data intervals exceeds the respective particle count threshold value; and
    when a raw particle count of the series falls below the first particle count threshold value, ending the data evaluation period;
    summing the raw particle counts from the first channel over the data evaluation period;
    summing the raw particle counts from the second channel over the data evaluation period;
    if the sum of the first channel raw particle counts exceeds a summed particle count threshold value, then calculating a ratio of the sum of the second channel raw particle counts to the sum of the first channel raw particle counts;
    if the ratio falls below a noise ratio threshold value, then identifying all the particle counts of the data evaluation period as having the detector noise signature.

6. The method of claim 1, wherein a first channel is correlated to a first particle size bin and a second channel is correlated to a second particle size bin;
    summing the raw particle counts from the first channel for a first predetermined number of sequential elemental data intervals;
    summing the raw particle counts from the second channel for the first predetermined number of sequential elemental data intervals;
    calculating a first ratio of the sum of the second channel raw particle counts for the first predetermined number of sequential elemental data intervals to the sum of the first channel raw particle counts for the first predetermined number of sequential elemental data intervals;

wherein if the first ratio falls below a noise ratio threshold value, then identifying all the particle counts of the first predetermined number of sequential elemental data intervals as having the detector noise signature.

7. The method of claim 1 wherein identifying the detector noise signature comprises:
for a first time interval comprising one or more elemental data intervals:
(a) comparing a raw particle count of a first channel of the plurality of channels to a predetermined first channel threshold value, wherein the first channel threshold value is such that at or above the first channel threshold value, at least one particle would be statistically likely to have been detected in a second channel of the plurality of channels, the second channel corresponding to particles of a larger size bin than the first channel;
(b) if the raw particle count of the first channel exceeds the first channel threshold value, then calculating a ratio of the raw particle count of the first channel to a raw particle count of the second channel and comparing the calculated ratio to a ratio threshold value;
(c) if the calculated ratio exceeds the ratio threshold value, then identifying the data of the first time interval as having the detector noise signature and removing it from the raw particle count data of the first interval to produce filtered first interval data; and
repeating steps (a)-(c) for a second time interval, wherein the second time interval is longer in duration than the first time interval and subsumes the first interval, and wherein the data of the second time interval includes the filtered first interval data.

8. The method of claim 1, comprising:
producing the beam of electromagnetic radiation via a laser;
monitoring an operating parameter of the laser;
comparing the laser operating parameter to a laser threshold value; and
if the operating parameter exceeds the laser threshold value, then identifying any raw particle count data associated with the rate of change as having the detector noise signature.

9. The method of claim 1, comprising:
producing the beam of electromagnetic radiation via a laser;
monitoring an electrical current of the laser over a time interval selected from the range of 10 microseconds to 1 second to produce electrical current rate of change data;
associating the raw particle count data with the electrical current rate of change data;
comparing the electrical current rate of change data to a current rate of change threshold value; and
if a rate of change of the electrical current exceeds the current rate of change threshold value, then identifying any raw particle count data associated with the excessive electrical current rate of change as having the detector noise signature.

10. The method of claim 1, comprising:
producing the beam of electromagnetic radiation via a laser;
monitoring an electrical power of the laser over a time interval selected from the range of 10 microseconds to 1 second to produce electrical power rate of change data;
associating the raw particle count data with the electrical power rate of change data;
comparing the electrical power rate of change data to a power rate of change threshold value; and
if a rate of change of the electrical power exceeds the power rate of change threshold value, then identifying any raw particle count data associated with the excessive electrical rate of change as having the detector noise signature.

11. The method of claim 1, wherein identifying the detector noise signature comprises:
monitoring the raw particle count data for a rate of change of particle;
comparing the rate of change of particle counts to a particle count threshold value; and
if a rate of change of the electrical power exceeds the particle count threshold value, then identifying any raw particle count data associated with the rate of change as having the detector noise signature.

12. The method of claim 1, wherein identifying the detector noise signature comprises:
monitoring the raw particle count data for an amplitude of change of particle counts;
comparing the amplitude of particle counts to an amplitude threshold value; and
if the amplitude exceeds the amplitude threshold value, then identifying any raw particle count data associated with the excess amplitude as having the detector noise signature.

13. The method of claim 1, wherein the photodetector is a first photodetector, the method comprising:
prior to exposing the fluid in the detection zone to the beam of electromagnetic radiation, directing a portion of the beam to a second photodetector;
generating beam stability data via the second photodetector;
monitoring the beam stability data to identify periods of beam instability;
in response to an identification of a period of beam instability, initiating a pause in collection of raw particle count data, the pause corresponding to the duration of the beam instability;
resuming the collection of raw particle count data.

14. The method of claim 1, comprising:
producing the beam of electromagnetic radiation via a laser;
controlling a parameter of the laser via closed loop control, wherein the controlling comprises:
monitoring the laser parameter;
comparing the laser output to at least one set point; and
if the comparison of the laser output to the at least one set point indicates that an adjustment is needed, then:
generating a pause collection signal; and
adjusting the laser output.

15. The method of claim 1, comprising:
producing the beam of electromagnetic radiation via a laser;
monitoring for periods of laser instability, wherein the monitoring comprises:
analyzing a parameter of the laser for a laser instability signature;
wherein, if the laser instability signature and/or the noise signature are identified, initiating a temporary pause in the storing of the raw particle count data and initiating a laser temperature perturbation.

16. The method of claim 1, comprising:
producing the beam of electromagnetic radiation via a laser;
controlling an output of the laser via closed loop control;
predicting a period of laser instability;
in response to the predicted period of laser instability, initiating a temporary pause in the storing of the raw particle count data and initiating a laser optimization routine.

17. The method of claim 16, comprising resuming storing the stream of raw particle count data after a predetermined time has elapsed.

18. The method of claim 16, comprising resuming storing the stream of raw particle count data after receiving a signal that the laser optimization routine is complete.

19. The method of claim 16, comprising:
in response to initiating the temporary pause, deleting a raw particle count data interval, the data interval corresponding to a time interval immediately prior to the initiation of the pause in the storing of the raw particle count data.

20. The method of claim 16, wherein predicting the period of laser instability comprises:
analyzing an operating parameter of the laser for a laser instability precursor signature.

21. The method of claim 16, wherein predicting the period of laser instability comprises:
analyzing laser stability historical data and calculating an average time between periods of laser instability;
predicting the period of laser instability based on the average time.

22. The method of claim 1, wherein the reporting interval has a time duration that is at least two times greater than that of each elemental data interval.

23. A method for reducing false-positive particle detection events of an optical particle detector, the method comprising:
flowing a particle-containing fluid through a detection region;
producing a beam of electromagnetic radiation via a laser;
exposing the fluid in the detection region to the beam of electromagnetic radiation, wherein interaction between particles of the particle-containing fluid and the beam of electromagnetic radiation generates scattered or emitted electromagnetic radiation from the particles;
directing at least a portion of the scattered or emitted electromagnetic radiation from the particles onto a photodetector;
generating a stream of raw particle count data via the photodetector, wherein the raw particle count data includes a plurality of channels;
temporarily storing the stream of raw particle count data;
periodically reporting a particle measurement output to a user at a reporting interval, wherein the particle measurement output is based on the stored particle count data; and
monitoring an operating parameter of the laser;
comparing the laser operating parameter to a parameter threshold value; and
if a rate of change of the laser operating parameter exceeds the parameter threshold value, flagging any raw particle count data associated with the rate of change as corresponding to a noise event and removing the flagged data from the stored raw particle count data before it is reported to the user.

24. The method of claim 23, comprising:
producing the beam of electromagnetic radiation via a laser;
monitoring an electrical current of the laser over a time interval selected from the range of 10 microseconds to 1 second to produce electrical current rate of change data;
associating the raw particle count data with the electrical current rate of change data;
comparing the electrical current rate of change data to a current rate of change threshold value; and
if a rate of change of the electrical current exceeds the current rate of change threshold value, then identifying any raw particle count data associated with the excessive electrical current rate of change as having the detector noise signature.

25. The method of claim 23, comprising:
producing the beam of electromagnetic radiation via a laser;
monitoring an electrical power of the laser over a time interval selected from the range of 10 microseconds to 1 second to produce electrical power rate of change data;
associating the raw particle count data with the electrical power rate of change data;
comparing the electrical power rate of change data to a power rate of change threshold value; and
if a rate of change of the electrical power exceeds the power rate of change threshold value, then identifying any raw particle count data associated with the excessive electrical rate of change as having the detector noise signature.

26. A system for reducing false-positive particle detection events of an optical particle detector, the system comprising:
a detection zone for flowing a particle-containing fluid therethrough;
a beam of electromagnetic radiation transiting the fluid in the detection zone, wherein interaction between particles of the particle-containing fluid and the beam of electromagnetic radiation generates scattered or emitted electromagnetic radiation from the particles;
a photodetector configured to:
receive at least a portion of the scattered or emitted electromagnetic radiation; and
generate raw particle count data, wherein the raw particle count data includes a plurality of channels, each channel being correlated to a different particle size bin;
a processor configured to:
filter the raw particle count data to produce filtered particle count data, wherein the filtering comprises:
buffer the raw particle count data for a buffering time period;
segment the raw particle count data into a series of elemental data intervals;
examine each elemental data interval for a noise signature;
identifying a noise signature in the segmented raw particle count data;
in response to the identified noise signature, flag one or more sequential elemental data intervals as corresponding to a noise event;
remove the one or more flagged elemental data intervals from the raw particle count data to produce the filtered particle count data, and/or generate replacement data and substitute the replacement data for the one or more flagged elemental data intervals to produce the filtered particle count data;

periodically report a particle measurement output to a user at a reporting interval, wherein the particle measurement output is based on the filtered particle count data; and wherein the reporting interval has a greater time duration than that of the elemental data intervals.

27. A system for reducing false-positive particle detection events of an optical particle detector, the system comprising:

a detection zone for flowing a particle-containing fluid therethrough;

a beam of electromagnetic radiation transiting the fluid in the detection zone, wherein interaction between particles of the particle-containing fluid and the beam of electromagnetic radiation generates scattered or emitted electromagnetic radiation from the particles;

a photodetector configured to:
  receive at least a portion of the scattered or emitted electromagnetic radiation; and
  generate raw particle count data, wherein the raw particle count data includes a plurality of channels, each channel being correlated to a different particle size bin;

a processor configured to:
  filter the raw particle count data to produce filtered particle count data, wherein the filtering comprises:
    buffer the raw particle count data for a buffering time period;
    segment the raw particle count data into a series of elemental data intervals;
    examine each elemental data interval for a noise signature;
  identifying a noise signature in the segmented raw particle count data;
    in response to the identified noise signature, flag one or more sequential elemental data intervals as corresponding to a noise event;
    remove the one or more flagged elemental data intervals from the raw particle count data to produce the filtered particle count data, and/or generate replacement data and substitute the replacement data for the one or more flagged elemental data intervals to produce the filtered particle count data;
  periodically report a particle measurement output to a user at a reporting interval, wherein the particle measurement output is based on the filtered particle count data; and
  wherein the reporting interval has a time duration greater than that of each elemental data interval.

* * * * *